United States Patent
Matsumura et al.

(10) Patent No.: US 12,342,337 B2
(45) Date of Patent: Jun. 24, 2025

(54) TERMINAL, RADIO COMMUNICATION METHOD, AND BASE STATION

(71) Applicant: NTT DOCOMO, INC., Tokyo (JP)

(72) Inventors: Yuki Matsumura, Tokyo (JP); Satoshi Nagata, Tokyo (JP); Weiqi Sun, Beijing (CN); Jing Wang, Beijing (CN); Lan Chen, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 393 days.

(21) Appl. No.: 18/040,217

(22) PCT Filed: Aug. 6, 2020

(86) PCT No.: PCT/JP2020/030269
§ 371 (c)(1),
(2) Date: Feb. 1, 2023

(87) PCT Pub. No.: WO2022/029979
PCT Pub. Date: Feb. 10, 2022

(65) Prior Publication Data
US 2023/0269734 A1 Aug. 24, 2023

(51) Int. Cl.
H04W 72/1268 (2023.01)
H04L 5/00 (2006.01)
H04W 72/232 (2023.01)

(52) U.S. Cl.
CPC ....... H04W 72/1268 (2013.01); H04L 5/0092 (2013.01); H04W 72/232 (2023.01)

(58) Field of Classification Search
CPC ............ H04W 72/1268; H04W 72/232; H04L 5/0092

USPC ......................................................... 370/329
See application file for complete search history.

(56) References Cited

U.S. PATENT DOCUMENTS

| | | | |
|---|---|---|---|
| 2021/0336664 A1* | 10/2021 | Yang | H04B 7/0456 |
| 2023/0078277 A1* | 3/2023 | Park | H04W 76/27 |
| | | | 370/329 |
| 2023/0118905 A1 | 4/2023 | Go et al. | |

FOREIGN PATENT DOCUMENTS

| | | |
|---|---|---|
| JP | 2023517732 A | 4/2023 |
| WO | 2021187823 A1 | 9/2021 |

OTHER PUBLICATIONS

International Search Report issued in Application No. PCT/JP2020/030269 mailed on Feb. 22, 2021 (6 pages).
Written Opinion issued in Application No. PCT/JP2020/030269 mailed on Feb. 22, 2021 (4 pages).
(Continued)

*Primary Examiner* — Peter G Solinsky
(74) *Attorney, Agent, or Firm* — Osha Bergman Watanabe & Burton LLP

(57) ABSTRACT

A terminal according to one aspect of the present disclosure includes a receiving section that receives single downlink control information (DCI) for a plurality of uplink shared channels (Physical Uplink Shared Channels (PUSCHs)), and a control section that controls transmission of the plurality of PUSCHs on the basis of an extended precoding information and number of layers field included in the DCI, wherein the control section assumes that the number of antenna ports is independently configured for each of the plurality of PUSCHs. According to one aspect of the present disclosure, it is possible to appropriately control PUSCH repetition transmission even when multi-TRP is applied.

6 Claims, 11 Drawing Sheets

(56) References Cited

OTHER PUBLICATIONS

3GPP TS 36.300 V8.12.0, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)", Mar. 2010 (149 pages).
Office Action issued in Japanese Application No. 2022-541064, mailed Jun. 25, 2024 (10 pages).

* cited by examiner

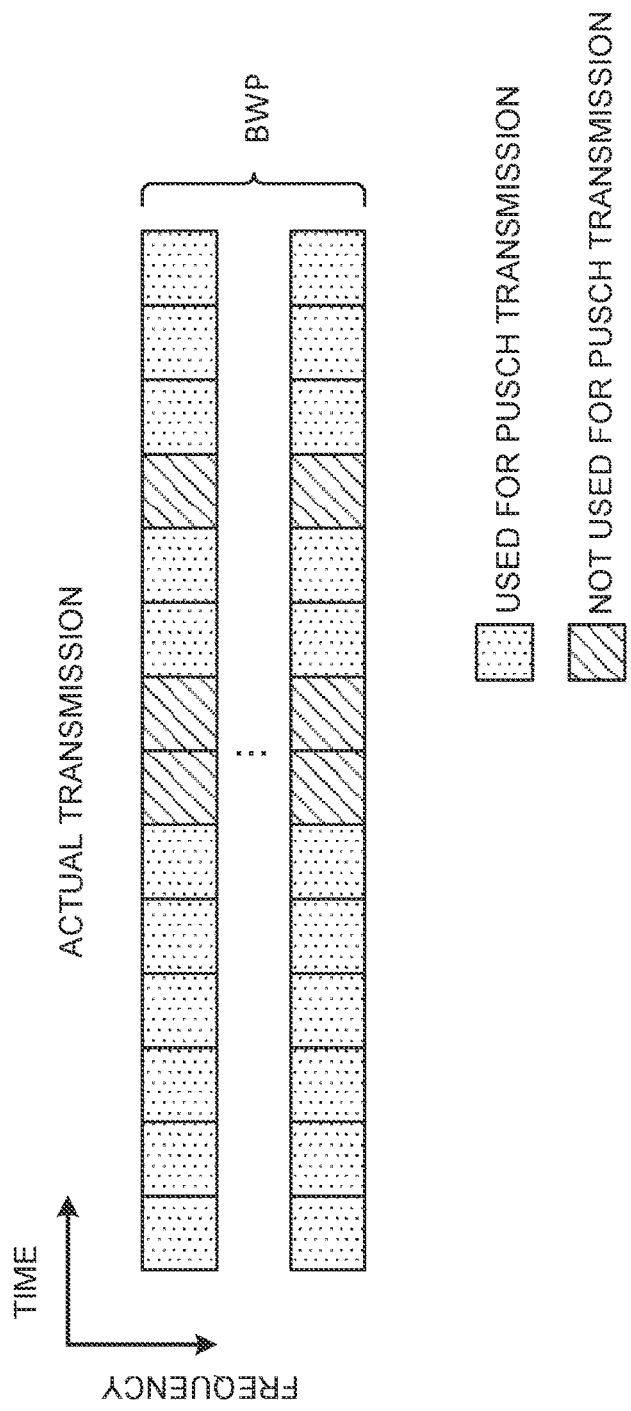

FIG. 6A

| $n_0$ | $n_1$ | $n_2$ | $n_3$ | $n_4$ | $n_5$ |

PRECODING INFORMATION AND NUMBER OF LAYERS FIELD

CORRESPONDING TO FIRST SRI: $n_0, n_1$

CORRESPONDING TO SECOND SRI: $n_2, n_3, n_4, n_5$

FIG. 6B

| $n_0$ | $n_1$ | ... | $n_5$ | $n_6$ | $n_7$ | ... | $n_{11}$ |

PRECODING INFORMATION AND NUMBER OF LAYERS FIELD

CORRESPONDING TO FIRST SRI: $n_0, n_1, ..., n_5$

CORRESPONDING TO SECOND SRI: $n_6, n_7, ..., n_{11}$

FIG. 7A

| $n_0$ | $n_1$ | $n_2$ | $n_3$ |
|---|---|---|---|

PRECODING INFORMATION AND NUMBER OF LAYERS FIELD

{ $n_0$, $n_1$ }: APPLIED TO PUSCH TRANSMISSION

{ $n_2$, $n_3$ }: SAME AS $n_0$ AND $n_1$, RESPECTIVELY

FIG. 7B

| $n_0$ | $n_1$ | $n_2$ | $n_3$ |
|---|---|---|---|

PRECODING INFORMATION AND NUMBER OF LAYERS FIELD

{ $n_0$, $n_1$ }: APPLIED TO PUSCH TRANSMISSION

{ $n_2$, $n_3$ }: SET TO 0

TERMINAL, RADIO COMMUNICATION METHOD, AND BASE STATION

TECHNICAL FIELD

The present disclosure relates to a terminal, a radio communication method, and a base station in next-generation mobile communication systems.

BACKGROUND ART

In a Universal Mobile Telecommunications System (UMTS) network, the specifications of Long-Term Evolution (LTE) have been drafted for the purpose of further increasing high speed data rates, providing lower latency and so on (see Non-Patent Literature 1). In addition, for the purpose of further high capacity, advancement and the like of the LTE (Third Generation Partnership Project (3GPP) Release (Rel.) 8 and Rel. 9), the specifications of LTE-Advanced (3GPP Rel. 10 to Rel. 14) have been drafted.

Successor systems of LTE (for example, also referred to as "5th generation mobile communication system (5G)," "5G+(plus)," "6th generation mobile communication system (6G)," "New Radio (NR)," "3GPP Rel. 15 (or later versions)," and so on) are also under study.

CITATION LIST

Non-Patent Literature

Non-Patent Literature 1: 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)," April, 2010

SUMMARY OF INVENTION

Technical Problem

In 3GPP Rel. 15, repetition transmission is supported for a UL data channel (for example, an uplink shared channel (Physical Uplink Shared Channel (PUSCH))). A UE performs control so as to perform transmission of the PUSCH across a plurality of slots (for example, K consecutive slots) on the basis of a repetition factor K configured from a network (for example, a base station). In other words, when the repetition transmission is performed, each PUSCH is transmitted in a different slot (for example, in units of slots).

On the other hand, for Rel. 16 (or later versions), a plurality of PUSCH transmissions performed in one slot in a case of PUSCH repetition transmission are under study. In other words, transmission of each PUSCH is performed in units shorter than the slots (for example, in units of sub-slots or in units of mini-slots).

For NR, communication using one or a plurality of transmission/reception points (TRPs) (multi-TRP) is under study.

However, for NR specifications thus far, how to control PUSCH repetition transmission in multi-panel/TRP has not been fully studied. Unless PUSCH repetition transmission in the multi-TRP is appropriately performed, throughput reduction or communication quality degradation may occur.

Thus, an object of the present disclosure is to provide a terminal, a radio communication method, and a base station that can appropriately control PUSCH repetition transmission.

Solution to Problem

A terminal according to one aspect of the present disclosure includes a receiving section that receives single downlink control information (DCI) for a plurality of uplink shared channels (Physical Uplink Shared Channels (PUSCHs)), and a control section that controls transmission of the plurality of PUSCHs on the basis of an extended precoding information and number of layers field included in the DCI, wherein the control section assumes that the number of antenna ports is independently configured for each of the plurality of PUSCHs.

Advantageous Effects of Invention

According to one aspect of the present disclosure, it is possible to appropriately control PUSCH repetition transmission even when multi-TRP is applied.

BRIEF DESCRIPTION OF DRAWINGS

FIGS. 2A and 2B are each a diagram to show an example of an invalid symbol pattern.

FIGS. 6A and 6B are each a diagram to show another example of the association between the extended precoding information and number of layers field and the SRI.

FIGS. 7A and 7B are each a diagram to show an example of an extended precoding information and number of layers field applied to a PUSCH.

DESCRIPTION OF EMBODIMENTS

Repetition Transmission

In Rel. 15, repetition transmission is supported in data transmission. For example, a base station (network (NW), gNB) repeatedly performs transmission of DL data (for example, a downlink shared channel (PDSCH)) a certain number of times. Alternatively, a UE performs a certain number of repetitions of UL data (for example, an uplink shared channel (PUSCH)).

Figure 1A:
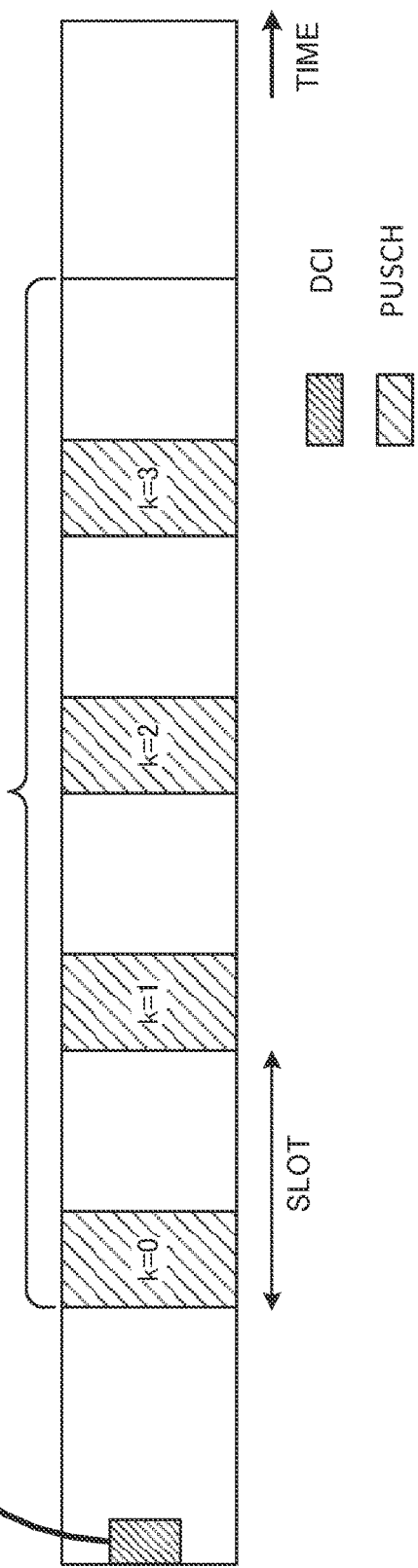
FIGS. 1A and 1B are each a diagram to show an example of PUSCH repetition transmission.

FIG. 1A is a diagram to show an example of PUSCH repetition transmission. FIG. 1A shows an example in which a certain number of repetitions of the PUSCH is scheduled by single DCI. The number of the repetitions is also referred to as a repetition factor K or an aggregation factor K.

The repetition factor K=4 in FIG. 1A, but a value of K is not limited to this. The n-th repetition is also referred to as the n-th transmission occasion or the like, and may be identified by a repetition index k (0≤k≤K−1). FIG. 1A shows repetition transmission of a PUSCH (for example, a dynamic grant-based PUSCH) dynamically scheduled by the DCI, but the present disclosure may be applied to repetition transmission of a configured grant-based PUSCH.

For example, in FIG. 1A, the UE semi-statically receives information (for example, aggregationFactorUL or aggregationFactorDL) indicating the repetition factor K by using higher layer signaling. Here, the higher layer signaling may be, for example, any one or combinations of RRC (Radio Resource Control) signaling, MAC (Medium Access Control) signaling, broadcast information, and the like.

For example, the MAC signaling may use MAC control elements (MAC CEs), MAC PDUs (Protocol Data Units), and the like. For example, the broadcast information may be master information blocks (MIBs), system information blocks (SIBs), minimum system information (RMSI (Remaining Minimum System Information)), and the like.

The UE controls PDSCH reception processing (for example, at least one of reception, demapping, demodulation, and decoding) or PUSCH transmission processing (for example, at least one of transmission, mapping, modulation, and coding) in K consecutive slots on the basis of a field value of at least one of the following (or information indicated by the field value) in DCI:

Allocation of time domain resources (for example, start symbols, the number of symbols in each slot, or the like)

Allocation of frequency domain resources (for example, a certain number of resource blocks (RBs) or a certain number of resource block groups (RBGs))

Modulation and coding scheme (MCS) index

Configuration of PUSCH demodulation reference signal (DMRS)

PUSCH spatial relation information (spatial relation info) or transmission configuration indication (TCI (or Transmission Configuration Indicator)) state (TCI state (TCI-state))

Identical symbol allocation may be applied between the K consecutive slots. FIG. 1A shows a case where a PUSCH in each slot is allocated to a certain number of symbols from the head of the slot. The identical symbol allocation between the slots may be determined in a manner such as described in the above-described time domain resource allocation.

For example, the UE may determine symbol allocation in each slot on the basis of a start symbol S and the number of symbols L (for example, Start and Length Indicator (SLIV)) determined on the basis of a value m of a certain field (for example, a TDRA field) in DCI. Note that the UE may determine the first slot on the basis of K2 information determined on the basis of the value m of the certain field (for example, the TDRA field) in the DCI.

On the other hand, between the K consecutive slots, redundancy versions (RVs) applied to a TB based on identical data may be identical to each other, or may be at least partially different from each other. For example, an RV applied to the TB in the n-th slot (transmission occasion, repetition) may be determined on the basis of a value of a certain field (for example, an RV field) in the DCI.

When resources allocated in the K consecutive slots have different communication directions at least one symbol in UL, DL, or Flexible of each slot specified by at least one of up/down link communication direction indication information for TDD control (for example, an RRC IE "TDD-UL-DL-ConfigCommon" or "TDD-UL-DL-ConfigDedicated") and a slot format identifier (Slot format indicator) of DCI (for example, DCI format 2_0), it may be assumed that resources of a slot including the symbol are not transmitted (or received).

In Rel. 15, as shown in FIG. 1A, the PUSCH is repeatedly transmitted across a plurality of slots (in units of slots), but in Rel. 16 (or later versions), it is assumed that PUSCH repetition transmission is performed in units shorter than the slots (for example, units of sub-slots, units of mini-slots, or units of a certain number of symbols) (see FIG. 1B).

Figure 1B:
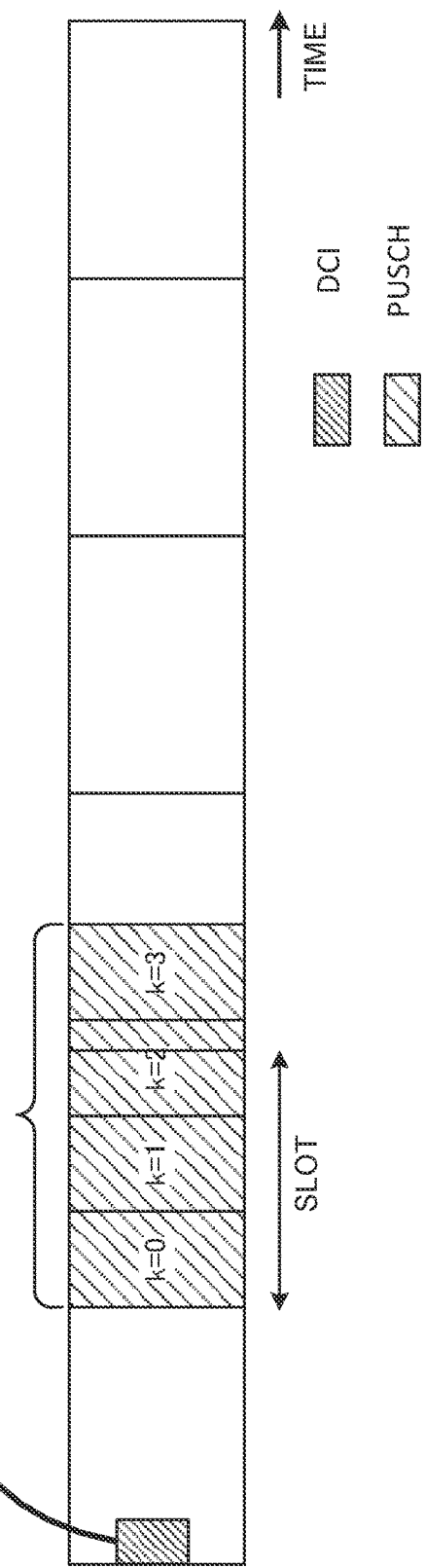

The repetition factor K=4 in FIG. 1B, but a value of K is not limited to this. The n-th repetition is also referred to as the n-th transmission occasion or the like, and may be identified by a repetition index k (0≤k≤K−1). FIG. 1B shows repetition transmission of a PUSCH (for example, a dynamic grant-based PUSCH) dynamically scheduled by the DCI, but the present disclosure may be applied to repetition transmission of a configured grant-based PUSCH.

The UE may determine symbol allocation for PUSCH transmission (for example, a PUSCH with k=0) in a certain slot on the basis of a start symbol S and the number of symbols L (for example, StartSymbol and length) determined on the basis of a value m of a certain field (for example, a TDRA field) in DCI for the PUSCH. Note that the UE may determine the certain slot on the basis of Ks information determined on the basis of the value m of the certain field (for example, the TDRA field) in the DCI.

The UE may dynamically receive information (for example, numberofrepetitions) indicating the repetition factor K by using downlink control information. The repetition factor may be determined on the basis of the value m of the certain field (for example, the TDRA field) in the DCI. For example, a table in which correspondence between a bit value, repetition factor K, start symbol S, and the number of symbols L notified by the DCI is defined may be supported.

Slot-based repetition transmission shown in FIG. 1A may be referred to as repetition transmission type A (for example, PUSCH repetition Type A), and sub-slot-based repetition transmission shown in FIG. 1B may be referred to as repetition transmission type B (for example, PUSCH repetition Type B).

Application of at least one of repetition transmission type A and repetition transmission type B may be configured for the UE. For example, a repetition transmission type to be applied by the UE may be notified from the base station to the UE by higher layer signaling (for example, PUSCHRepTypeIndicator).

Either one of repetition transmission type A or repetition transmission type B may be configured for the UE for each DCI format to schedule the PUSCH.

For example, with respect to a first DCI format (for example, DCI format 0_1), when higher layer signaling (for example, PUSCHRepTypeIndicator-AorDCIFormat0_1) is configured with repetition transmission type B (for example, PUSCH-RepTypeB), the UE applies repetition transmission type B to PUSCH repetition transmission scheduled by the first DCI format. In a case other than that (for example, a case where PUSCH-RepTypeB is not configured or a case where PUSCH-RepTypeA is configured), the UE the UE applies repetition transmission type A to PUSCH repetition transmission scheduled by the first DCI format.

(Invalid Symbol Pattern)

It is also under study that information related to a symbol (or symbol pattern) unavailable for PUSCH transmission is notified to the UE when repetition transmission type B is applied to the PUSCH transmission. The symbol pattern unavailable for the PUSCH transmission may also be referred to as an invalid symbol pattern or the like.

Notification of the invalid symbol pattern using at least one of higher layer signaling and DCI is under study. The DCI may be a certain DCI format (for example, at least one of DCI format 0_1 and DCI format 0_2).

For example, information related to the invalid symbol pattern unavailable for the PUSCH transmission is notified to the UE by using a first higher layer parameter. The presence or absence of application of the information related to the invalid symbol pattern may be notified to the UE by using the DCI. In this case, a bit field (field for notification of the presence or absence of application of the invalid symbol pattern) for indicating the presence or absence of application of the information related to the invalid symbol pattern may be configured for the DCI.

The presence or absence of configuration of the notification field (or an additional bit) in the DCI may be notified to the UE by using a second higher layer parameter. In other words, when the information related to the invalid symbol pattern is notified by the first higher layer parameter, the UE may determine the presence or absence of application of the information related to the invalid symbol pattern on the basis of the second higher layer parameter and the DCI.

When the first higher layer parameter is not notified or configured, the UE may control PUSCH transmission without considering the invalid symbol pattern. When the first higher layer parameter is notified or configured, the UE may determine the presence or absence of application of the invalid symbol pattern on the basis of the second higher layer parameter and the DCI. For example, when the addition of an additional bit (or certain field) to indicate the presence or absence of application of the invalid symbol pattern for the DCI is indicated by the second higher layer parameter, the UE may determine the presence or absence of application of the invalid symbol pattern on the basis of the certain field.

It is only necessary that the first higher layer parameter is information to notify a symbol pattern invalid for PUSCH transmission, and for example, a bitmap form may be applied (see FIG. 2A). FIG. 2A is a diagram to show an example of a case where the invalid symbol pattern is defined by a bitmap (1-D bitmap) in relation to a time domain. The UE may determine, on the basis of information related to the invalid symbol pattern, resources available for the PUSCH transmission in one or more frequency bandwidths (for example, BWPs) (see FIG. 2B).

FIG. 2B shows a case where one or common invalid symbol pattern is applied to a plurality of BWPs, but a different invalid symbol pattern may be configured or applied for each BWP.

Nominal Repetitions/Actual Repetitions

When the repetition transmission is performed in units of sub-slots by applying repetition transmission type B, depending on a repetition factor (K), a data allocation unit, and the like, a case where certain repetition transmission crosses a slot boundary (slot-boundary) occurs.

Figure 3A:
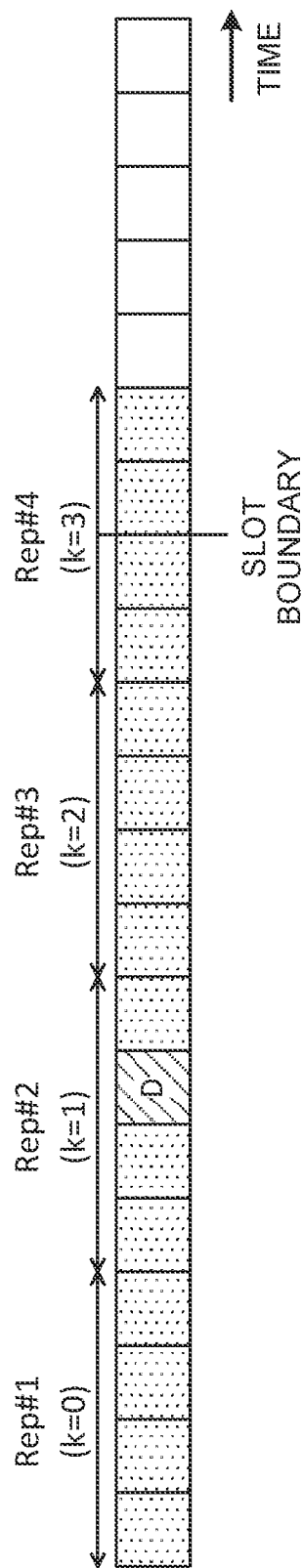
FIGS. 3A and 3B are diagrams to show an example of nominal repetitions and actual repetitions.

FIG. 3A shows an example of a case where repetition transmission type B with a repetition factor (K) being 4 and a PUSCH length (L) being 4 is applied. In FIG. 3A, a PUSCH with k=3 is arranged across the slot boundary. In such a case, the transmission may be performed such that the PUSCH is divided (or segmented) by using the slot boundary as a reference (see FIG. 3B).

A case where a symbol (for example, a DL symbol, an invalid symbol, or the like) unavailable for PUSCH transmission is included in a slot is also assumed. FIG. 3A shows a case where the symbol (here, DL symbol) unavailable for the PUSCH transmission is included in some symbols in which a PUSCH with k=1 is arranged. In such a case, the PUSCH transmission may be performed by using symbols except the DL symbol (see FIG. 3B).

In allocated symbols for a certain PUSCH, when a DL symbol (or invalid symbol) is included in symbols other than symbols on both ends, PUSCH transmission may be performed by using symbols other than a portion of the DL symbol. In this case, the PUSCH may be divided (or segmented).

Figure 3B:
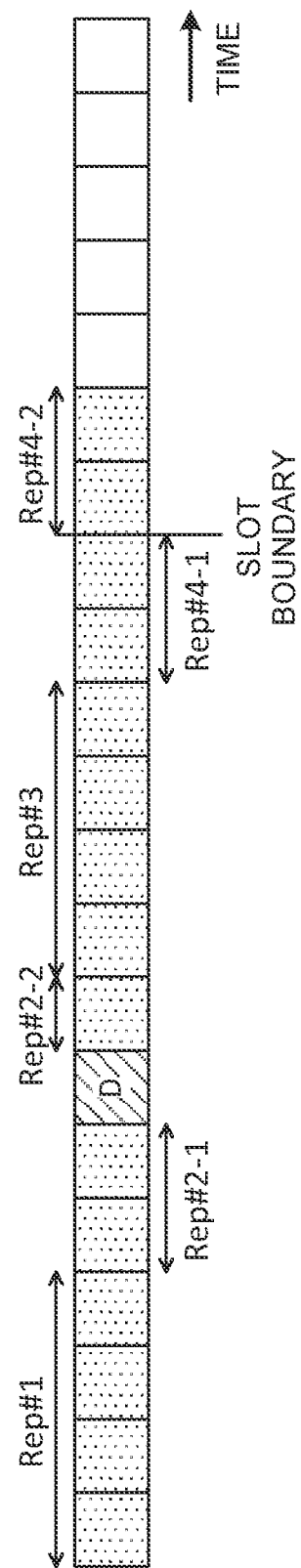

FIG. 3B shows a case where, in sub-slot-based repetition transmission, a PUSCH with k=1 (Rep #2) is divided into two portions (Rep #2-1 and Rep #2-2) due to the DL symbol, and a PUSCH with k=3 (Rep #4) is divided into two portions (Rep #4-1 and Rep #4-2) due to the slot boundary.

Note that the repetition transmission before consideration of the DL symbol, invalid symbol, or slot boundary (FIG. 3A) may be referred to as nominal repetitions. The repetition transmission with consideration of the DL symbol, invalid symbol, or slot boundary (FIG. 3B) may be referred to as actual repetitions.

Spatial Relation for SRS and PUSCH

In Rel-15 NR, the UE may receive information (SRS configuration information, for example, a parameter in an RRC control element "SRS-Config") used for transmission of a measurement reference signal (for example, a sounding reference signal (SRS)).

Specifically, the UE may receive at least one of information related to one or a plurality of SRS resource sets (SRS resource set information, for example, an RRC control element "SRS-ResourceSet") and information related to one or a plurality of SRS resources (SRS resource information, for example, an RRC control element "SRS-Resource").

One SRS resource set may be related to a certain number of SRS resources (a certain number of SRS resources may be grouped together). Each SRS resource may be identified by an SRS resource indicator (SRI) or an SRS resource ID (Identifier).

The SRS resource set information may include an SRS resource set ID (SRS-ResourceSetId), a list of SRS resource IDs (SRS-ResourceId) used in the resource set, an SRS resource type (for example, any one of a periodic SRS, a semi-persistent SRS, and aperiodic SRS (Aperiodic SRS)), and information about SRS usage.

Here, the SRS resource type may indicate any one of a periodic SRS (P-SRS), a semi-persistent SRS (SP-SRS), and aperiodic CSI (Aperiodic SRS (A-SRS)). Note that the UE may periodically (or, after activation, periodically) transmit the P-SRS and the SP-SRS, and may transmit the A-SRS on the basis of an SRS request from DCI.

The usage (an RRC parameter "usage" or an L1 (Layer-1) parameter "SRS-SetUse") may be, for example, beam management (beamManagement), codebook (CB), non-codebook (noncodebook (NCB)), antenna switching, or the like. An SRS for codebook or non-codebook usage may be used for determination of a precoder for codebook-based or non-codebook-based PUSCH transmission based on the SRI.

For example, in a case of the codebook-based transmission, the UE may determine the precoder for the PUSCH transmission on the basis of an SRI, a transmitted rank indicator (TRI), and a transmitted precoding matrix indicator (TPMI). In a case of the non-codebook-based transmission, the UE may determine the precoder for the PUSCH transmission on the basis of an SRI.

The SRS resource information may include an SRS resource ID (SRS-ResourceId), the number of SRS ports, an SRS port number, a transmission Comb, SRS resource mapping (for example, a time and/or frequency resource location, resource offset, a resource periodicity, the number of repetitions, the number of SRS symbols, an SRS bandwidth, or the like), hopping-related information, an SRS resource type, a sequence ID, SRS spatial relation information, and the like.

The SRS spatial relation information (for example, an RRC information element "spatialRelationInfo") may indicate information about a spatial relation between a certain reference signal and an SRS. The certain reference signal may be at least one of a synchronization signal/broadcast channel (Synchronization Signal/Physical Broadcast Channel (SS/PBCH)) block, a channel state information reference signal (CSI-RS), and an SRS (for example, another SRS). The SS/PBCH block may be referred to as a synchronization signal block (SSB).

The SRS spatial relation information may include, as an index of the above-described certain reference signal, at least one of an SSB index, a CSI-RS resource ID, and an SRS resource ID.

Note that in the present disclosure, an SSB index, an SSB resource ID, and an SSB Resource Indicator (SSBRI) may be interchangeably interpreted. A CSI-RS index, a CSI-RS resource ID, and a CSI-RS Resource Indicator (CRI) may be interchangeably interpreted. An SRS index, an SRS resource ID, and an SRI may be interchangeably interpreted.

The SRS spatial relation information may include a serving cell index, a BWP index (BWP ID), and the like corresponding to the above-described certain reference signal.

With respect to a certain SRS resource, when spatial relation information related to an SSB or CSI-RS and an SRS is configured, the UE may transmit the SRS resource by using the same spatial domain filter (spatial domain transmission filter) as a spatial domain filter (spatial domain reception filter) for reception of the SSB or CSI-RS. In this case, the UE may assume that a UE receive beam of the SSB or CSI-RS and a UE transmit beam of the SRS are the same.

With respect to a certain SRS (target SRS) resource, when spatial relation information related to another SRS (reference SRS) and the SRS (target SRS) is configured, the UE may transmit the target SRS resource by using the same spatial domain filter (spatial domain transmission filter) as a spatial domain filter (spatial domain transmission filter) for transmission of the reference SRS. In other words, in this case, the UE may assume that a UE transmit beam of the reference SRS and a UE transmit beam of the target SRS are the same.

The UE may determine, on the basis of a value of a certain field (for example, an SRS resource indicator (SRI) field) in DCI (for example, DCI format 0_1), a spatial relation for a PUSCH scheduled by the DCI. Specifically, the UE may use, for PUSCH transmission, spatial relation information (for example, an RRC information element "spatialRelationInfo") about an SRS resource determined on the basis of the value of the certain field (for example, the SRI).

When the codebook-based transmission is used for the PUSCH, two SRS resources per SRS resource set may be configured for the UE by RRC, and one of the two SRS resources may be indicated for the UE by DCI (1-bit SRI field). When the non-codebook-based transmission is used for the PUSCH, four SRS resources per SRS resource set may be configured for the UE by RRC, and one of the four SRS resources may be indicated for the UE by DCI (2-bit SRI field).

TPMI and Transmitted Rank

For Rel. 16, it is under study that a transmitted precoding matrix indicator (TPMI) and a transmitted rank for codebook-based PUSCH transmission are specified by a specific field (for example, a precoding information and number of layers field) included in downlink control information (for example, DCI format 0_1).

A precoder used by the UE for the codebook-based PUSCH transmission may be selected from an uplink codebook having the same number of antenna ports as a value configured by a higher layer parameter (for example, nrofSRS-Ports) configured for SRS resources.

A size (number of bits) of the specific field is variable depending on the number of antenna ports for the PUSCH (for example, the number of ports indicated by the above-described nrofSRS-Ports) and several higher layer parameters.

When a higher layer parameter (for example, txConfig) configured for the UE is configured as non-codebook (non-Codebook), the specific field may be 0 bit.

When the higher layer parameter (for example, txConfig) configured for the UE is configured as codebook for one antenna port, the specific field may be 0 bit.

When the higher layer parameter (for example, txConfig) configured for the UE is configured as codebook for four antenna ports, the specific field may have a bit-length of 2 to 6 bits on the basis of at least one of another higher layer parameter configured for the UE and the presence or absence (validity or invalidity) of a transform precoder.

When the higher layer parameter (for example, txConfig) configured for the UE is configured as codebook for two antenna ports, the specific field may have a bit-length of 1 to 4 bits on the basis of at least one of another higher layer parameter configured for the UE and the presence or absence (validity or invalidity) of the transform precoder.

Such another higher layer parameter may be at least one of a parameter for specifying a UL full power transmission mode (for example, ul-FullPowerTransmission), a parameter indicating a maximum value of a UL transmitted rank (for example, maxRank), a parameter indicating a certain sub-set of precoding matrix indicators (PMIs) (for example, codebookSubset), and a parameter for specifying the transform precoder (for example, transformPrecoder).

Multi-TRP

Figure 4:
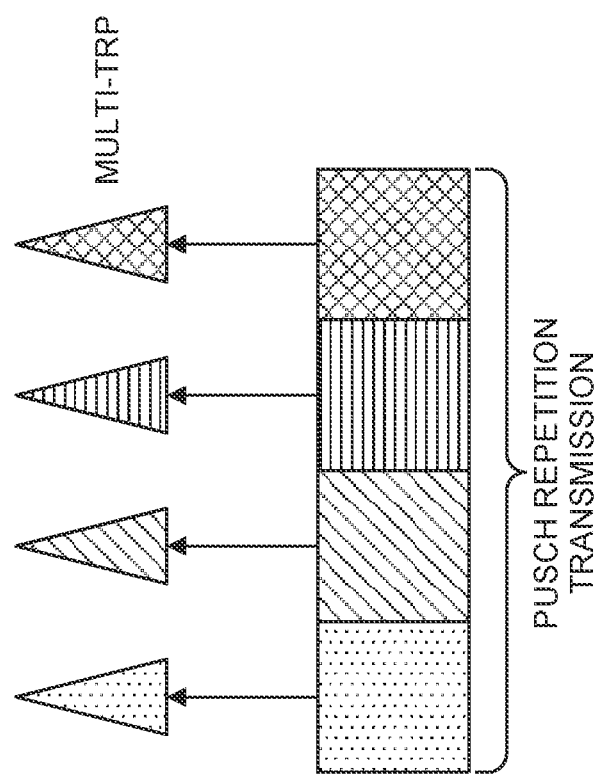
FIG. 4 is a diagram to show an example of PUSCH repetition transmission in multi-TRP.

For NR, it is under study that one or a plurality of transmission/reception points (TRPs) (multi-TRP) perform DL transmission to a UE by using one or a plurality of panels (multi-panel). It is also under study that the UE performs UL transmission to one or a plurality of TRPs (see FIG. 4).

The plurality of TRPs may correspond to the same cell identifier (ID), or may correspond to different cell IDs. The cell ID may be a physical cell ID, or may be a virtual cell ID.

However, in NR specifications thus far, how to control PUSCH repetition transmission in multi-panel/TRP has not been fully studied. Unless PUSCH repetition transmission in the multi-TRP is appropriately performed, throughput reduction or communication quality degradation may occur.

More specifically, for PUSCH repetition transmission in a plurality of TRPs with single DCI, a case that a plurality of pieces of SRI/combinations of pieces of SRI for the plurality of TRPs are indicated by the DCI is under study. In this case, considering that channel states between the UE and the respective different TRPs varies, it is preferable that different TPMIs correspond to different pieces of SRI/combinations of pieces of SRI.

However, a method for indicating a plurality of TPMIs by using single DCI has not been fully studied. Thus, the inventors of the present invention came up with the idea of a control method of PUSCH repetition transmission for resolving the above-described issue.

Embodiments according to the present disclosure will be described in detail with reference to the drawings as follows. The radio communication methods according to respective embodiments may each be employed individually, or may be employed in combination.

Note that in the present disclosure, a port, a panel, a beam, an Uplink (UL) transmission entity, a TRP, spatial relation information (SRI), a spatial relation, a control resource set (COntrol REsource SET (CORESET)), a PDSCH, a codeword, a base station, a certain antenna port (for example, a demodulation reference signal (DMRS) port), a certain antenna port group (for example, a DMRS port group), a certain group (for example, a code division multiplexing (CDM) group, a certain reference signal group, a CORESET group, a panel group, a beam group, a spatial relation group, or a PUCCH group), and a CORESET pool may be interchangeably interpreted. A panel Identifier (ID) and a panel may be interchangeably interpreted. A TRP ID and a TRP may be interchangeably interpreted.

In the present disclosure, an index, an ID, an indicator, and a resource ID may be interchangeably interpreted.

In the present disclosure, "A/B" may mean "at least one of A and B."

In the present disclosure, a list, a group, a cluster, a sub-set, and the like may be interchangeably interpreted. In the present disclosure, spatial relation information (SRI), an SRS resource indicator (SRI) (or SRI field), an SRS resource, a precoder, and the like may be interchangeably interpreted.

In the present disclosure, spatial relation information (SRI), a combination of pieces of SRI, SRI for codebook-based transmission, a combination of pieces of non-codebook-based SRI, spatialRelationInfo, a UL TCI, a TCI state, a Unified TCI, QCL, and the like may be interchangeably interpreted.

In the present disclosure, a first TRP and a second TRP may be interchangeably interpreted as a first PUSCH and a second PUSCH, a first PUSCH transmission occasion and a second PUSCH transmission occasion, first SRI and second SRI, or the like.

A PUSCH across a plurality of TRPs in the embodiments below may be interchangeably interpreted as PUSCH repetition across a plurality of TRPs, or just as PUSCH repetition, repetition transmission, a plurality of PUSCH transmissions, or the like.

Note that respective embodiments in the present disclosure will be described by using, as an example, PUSCH transmission across a plurality of TRPs with single DCI and codebook-based PUSCH transmission, but PUSCH transmission in which the respective embodiments can be employed is not limited to these.

Radio Communication Method

First Embodiment

In a first embodiment, when PUSCH repetition transmission across a plurality of TRPs is performed, the same number of antenna ports may be configured/indicated for different TRPs (different PUSCHs). In other words, the same number of antenna ports may be configured/indicated for a plurality of TRPs (a plurality of PUSCHs) in common. In this case, a UE may assume that the same number of antenna ports is configured/indicated for the plurality of TRPs (the plurality of PUSCHs) in common.

In this case, the UE may assume (expect) that a plurality of pieces of SRI corresponding to a plurality of SRS resources having the same value of a specific higher layer parameter (for example, nrofSRS-Ports) are indicated by DCI.

In this case, the number of antenna ports for codebook determination for the PUSCH across the plurality of TRPs may be configured/indicated for the UE.

The number of antenna ports for the codebook determination (for example, for referring to the codebook) may be configured for the UE by higher layer signaling (for example, an RRC information element "PUSCH-Config" for PUSCH configuration), or may be indicated for the UE by a DCI field (for example, a number of antenna ports field). Note that a code point of the number of antenna ports field may be mapped to 1, 2, 4, or another number of antenna ports to be supported.

The number of antenna ports for the codebook determination need not depend on the number of antenna ports for the SRS resources (given by, for example, a higher layer parameter "nrofSRS-Ports"). In other words, the number of antenna ports for the codebook may be notified to the UE by a higher layer parameter different from the higher layer parameter for the number of antenna ports for the SRS resources or by the number of antenna ports field.

A method of indicating a specific field (for example, a precoding information and number of layers field) included in DCI for indicating a TPMI in the first embodiment will be described below. The UE may determine a TPMI for PUSCH transmission in accordance with at least one of indication method 1-1 or indication method 1-2 described below. The precoding information and number of layers field will be described below, but the precoding information and number of layers field of the present disclosure may be interpreted as a specific field for indicating the TPMI.

Indication Method 1-1

A precoding information and number of layers field included in scheduling DCI may have the same number of bits as the number of bits defined in Rel. 15/16.

In this case, one precoding information and number of layers field included in single DCI may be indicated for the UE. In other words, the UE may determine the TPMI on the basis of one precoding information and number of layers field included in single DCI. Next, the UE may apply the precoding information and number of layers field/TPMI to PUSCH transmission with different TRPs.

Indication Method 1-2

The precoding information and number of layers field included in the scheduling DCI may have the number of bits extended to a specific number, as compared to that of Rel. 15/16. The specific number may be represented by X×M.

The above-described X may be determined on the basis of a size of a precoding information and number of layers field included in DCI for performing UL transmission to one TRP. For example, the above-described X may be determined on the basis of at least one of the number of antenna ports and a number configured by a specific higher layer parameter (for example, at least one of ul-FullPowerTransmission, maxRank, codebookSubset, and transformPrecoder).

The above-described X may be a fixed value. The UE may assume that the above-described X has a fixed size regardless of the number of antenna ports configured by a higher layer. The UE may assume that the above-described X has a fixed size regardless of a value of the number of antenna ports field (the number of antenna ports indicated by the number of antenna ports field).

In existing NR specifications, in a case of codebook-based transmission, a size of a precoding information field is variable on the basis of a semi-statically configured number of antenna ports (for example, the same number of ports as the number of SRS ports indicated by a higher layer parameter "nrofSRS-Ports"). This is because a fixed size of the precoding information field, on the other hand, is more preferable (because dynamically varying a DCI size makes it difficult to appropriately perform decoding) when the number of antenna ports is dynamically specified by the number of antenna ports field.

A value of the above-described X may be defined by specifications beforehand, may be configured by higher layer signaling, or may be determined on the basis of a UE capability.

The above-described M may be the number of TRPs, or may be the number of pieces of spatial relation information (SRI) that can be indicated for PUSCH transmission across the plurality of TRPs.

In this case, when an extended precoding information and number of layers field is divided by a specific number of (for example, 2, 4, or the like) bits, the x th (x is an arbitrary integer) smallest (or largest) specific number of bits may be associated with the x th SRI indicated by the DCI.

Figure 5:
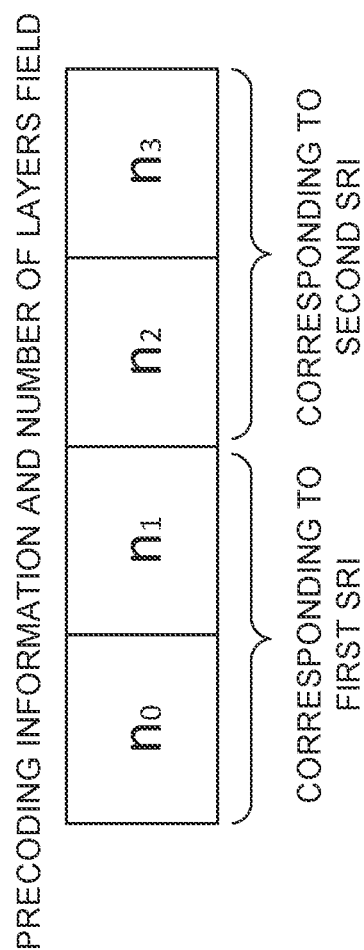
FIG. 5 is a diagram to show an example of association between an extended precoding information and number of layers field and SRI.

FIG. 5 is a diagram to show an example of association between the extended precoding information and number of layers field and the SRI. The example shown in FIG. 5 shows a case where the number of bits of the extended precoding information and number of layers field is 4, and M=2. In the example of FIG. 5, the precoding information and number of layers field indicates low order bits on the left side of FIG. 5, and indicates high order bits on the right side of FIG. 5. In this case, 2 low order bits ($n_0$ and $n_1$) of the precoding information and number of layers field correspond to first SRI (is used for PUSCH transmission with the first SRI), and 2 high order bits ($n_2$ and $n_3$) of the precoding information and number of layers field correspond to second SRI (is used for PUSCH transmission with the second SRI).

Note that in the example shown in FIG. 5, the precoding information and number of layers field may have the same size in respective PUSCH transmission occasions (respective TRPs).

Note that in diagrams shown in the present disclosure, all of the SRI, the number of bits and value of the precoding information and number of layers field, and the like are examples, and the present disclosure is not limited to this. In the diagrams shown in the present disclosure, for convenience, the precoding information and number of layers field indicates lower order bits on the left side, and indicates higher order bits on the right side, but the present disclosure is not limited to this.

According to the above first embodiment, in performing PUSCH repetition transmission across a plurality of TRPs, it is possible to appropriately indicate a TPMI even in a case where the same number of antenna ports is configured/indicated for PUSCHs for different TRPs.

Second Embodiment

In a second embodiment, when PUSCH repetition transmission across a plurality of TRPs is performed, different numbers/same number of antenna ports may be configured/indicated for different TRPs (different PUSCHs). In other words, the number of antenna ports may be separately configured/indicated for a plurality of TRPs (a plurality of PUSCHs). In this case, a UE may assume that the number of antenna ports is independently configured/indicated for each of the plurality of TRPs (the plurality of PUSCHs).

In this case, the UE may assume (expect) that a plurality of pieces of SRI corresponding to a plurality of SRS resources having different values of a specific higher layer parameter (for example, nrofSRS-Ports) are indicated by DCI.

In this case, a plurality of numbers of antenna ports for codebook determination for the PUSCH across the plurality of TRPs may be configured/indicated for the UE in a manner similar to that described in the first embodiment.

A method of indicating a specific field (for example, a precoding information and number of layers field) included in DCI for indicating a TPMI in the second embodiment will be described below. The UE may determine a TPMI for PUSCH transmission in accordance with indication method 2 described below.

Note that, when PUSCH repetition transmission across the plurality of TRPs is performed, the UE may follow the method described in the above-described first embodiment in a case where the same number of antenna ports is configured/indicated for different TRPs.

Indication Method 2

A precoding information and number of layers field included in scheduling DCI may have the number of bits extended to a specific number, as compared to that of Rel. 15/16. The specific number may be represented by $X_1+X_2+\ldots+X_M$.

The above-described $X_i$ (i is an arbitrary integer from 1 to M) may be determined on the basis of a size of a precoding information and number of layers field included in DCI for performing UL transmission to the i th TRP. For example, the above-described $X_i$ may be determined on the basis of at least one of the number of antenna ports and a number configured by a specific higher layer parameter (for example, at least one of ul-FullPowerTransmission, maxRank, codebookSubset, and transformPrecoder). The above-described $X_i$ may be set to a fixed value.

The above-described M may be the number of TRPs, or may be the number of pieces of spatial relation information (SRI) that can be indicated for PUSCH transmission across the plurality of TRPs.

In this case, when an extended precoding information and number of layers field is divided by bits for respective $X_i$ (i is an arbitrary integer from 1 to M), the $X_1+X_2+\ldots+X_{i-1}+1$ th smallest (or largest) bit to the $X_1+X_2+\ldots+X_i$ th bit may be associated with the i th SRI indicated by the DCI.

Note that respective values of $X_1, X_2, \ldots, X_M$ may be the same value, or may be different values.

FIG. 6A is a diagram to show another example of the association between the extended precoding information and number of layers field and the SRI. The example shown in FIG. 6A shows a case where M=2, the precoding information and number of layers field for a first TRP has 2 bits, and the precoding information and number of layers field for a second TRP has 4 bits. In this case, certain 2 bits ($n_0$ and $n_1$) of the extended precoding information and number of layers field correspond to first SRI for the first TRP, and the remaining 4 bits ($n_2$ to $n_5$) correspond to second SRI for the second TRP.

Note that in the example shown in FIG. 6A, the precoding information and number of layers field may have different sizes in respective PUSCH transmission occasions (respective TRPs), and the sizes may depend on configuration of a higher layer parameter.

FIG. 6B is a diagram to show another example of the association between the extended precoding information and number of layers field and the SRI. The example shown in FIG. 6B shows a case where M=2, and the precoding information and number of layers field for the first TRP and the precoding information and number of layers field for the second TRP are each fixed to 6 bits. In this case, certain 6 bits ($n_0$ to $n_5$) of the extended precoding information and number of layers field correspond to first SRI for the first TRP, and the remaining 6 bits ($n_6$ to $n_{11}$) correspond to second SRI for the second TRP.

According to the above second embodiment, in performing PUSCH repetition transmission across a plurality of TRPs, it is possible to appropriately indicate a TPMI even in a case where different numbers of antenna ports are configured/indicated for PUSCHs for different TRPs.

Variations of First and Second Embodiments

When dynamic switching between PUSCH transmission using one TRP and PUSCH transmission using a plurality of TRPs is supported (for example, when a case that one or a plurality of pieces of SRI are indicated by DCI is allowed), one or a plurality of pieces of SRI may be indicated by the DCI. In this case, when one piece of (single) SRI is specified by the DCI, the extended precoding information and number of layers field may follow at least one of method 1 or method 2 below.

Method 1

The UE may determine that a specific number of (for example, 2M) bits of a precoding information and number of layers field included in the DCI are valid bits. In other words, the UE may apply, to PUSCH transmission, the specific number of (for example, 2M) bits of the precoding information and number of layers field included in the DCI. In this case, M may be the number of TRPs, or may be a maximum number of pieces of SRI that can be indicated for PUSCH transmission with the plurality of TRPs.

Some bits (for example, 2 bits) out of the 2M bits of the precoding information and number of layers field in the DCI may indicate precoding information and the number of layers corresponding to any one of the pieces of SRI. Bits other than those (remaining 2M−2 bits) may be set to the same value as a value of the some bits.

FIG. 7A is a diagram to show an example of the extended precoding information and number of layers field applied to the PUSCH. In this case, the 2 lowest order bits ($n_0$ and $n_1$) of the precoding information and number of layers field are applied to the PUSCH transmission. On the other hand, the remaining 2 bits ($n_2$ and $n_3$) are set to valid bits, that are the same values as that of $n_0$ and $n_1$, respectively.

Method 2

The UE may determine that a specific number of (for example, 2) lowest order (or highest order) bits of the precoding information and number of layers field included in the DCI are valid bits. Bits other than those may be set to a fixed value (for example, 0 or 1). The UE may ignore the bits other than those. This specific number may correspond to a size of a precoding information and number of layers field for one TRP, and may be determined on the basis of the number of antenna ports and the like as mentioned above, or may be a fixed number of bits.

FIG. 7B is a diagram to show an example of the extended precoding information and number of layers field applied to the PUSCH. In this case, the 2 lowest order bits ($n_0$ and $n_1$) of the precoding information and number of layers field are applied to the PUSCH transmission. On the other hand, the remaining 2 bits ($n_2$ and $n_3$) are set to a fixed value (here, 0).

According to the above variations of the first and second embodiments, it is possible to appropriately control PUSCH transmission by using an extended precoding information and number of layers field in both cases of one piece of (single) SRI/combination of pieces of SRI specified by DCI and a plurality of pieces of SRI/combinations of pieces of SRI specified by the DCI.

Third Embodiment

In a third embodiment, a UE capability related to a precoding information and number of layers field will be described. A UE may report (transmit), to a NW, whether to have the capability.

The UE capability related to the precoding information and number of layers field may be defined as information related to whether to use same/different antenna ports for different TRPs (different PUSCH transmissions).

The UE capability related to the precoding information and number of layers field may be defined as information related to whether different TPMIs are indicated for different TRPs (different PUSCH transmissions).

Note that respective embodiments of the present disclosure may be employed under a condition of at least one of a case where the UE has reported, to the NW, a UE capability corresponding to the above-described at least one and a case where the UE capability for the above-described at least one is configured/activated/indicated for the UE by higher layer signaling. The respective embodiments of the present disclosure may be employed in a case where a specific higher layer parameter (for example, information to enable an extended precoding information and number of layers field, information to configure more than two TPMIs, a parameter to enable M-TRP repetition, or the like) is configured/activated/indicated for the UE.

Radio Communication System

Hereinafter, a structure of a radio communication system according to one embodiment of the present disclosure will be described. In this radio communication system, the radio communication method according to each embodiment of the present disclosure described above may be used alone or may be used in combination for communication.

Figure 8:
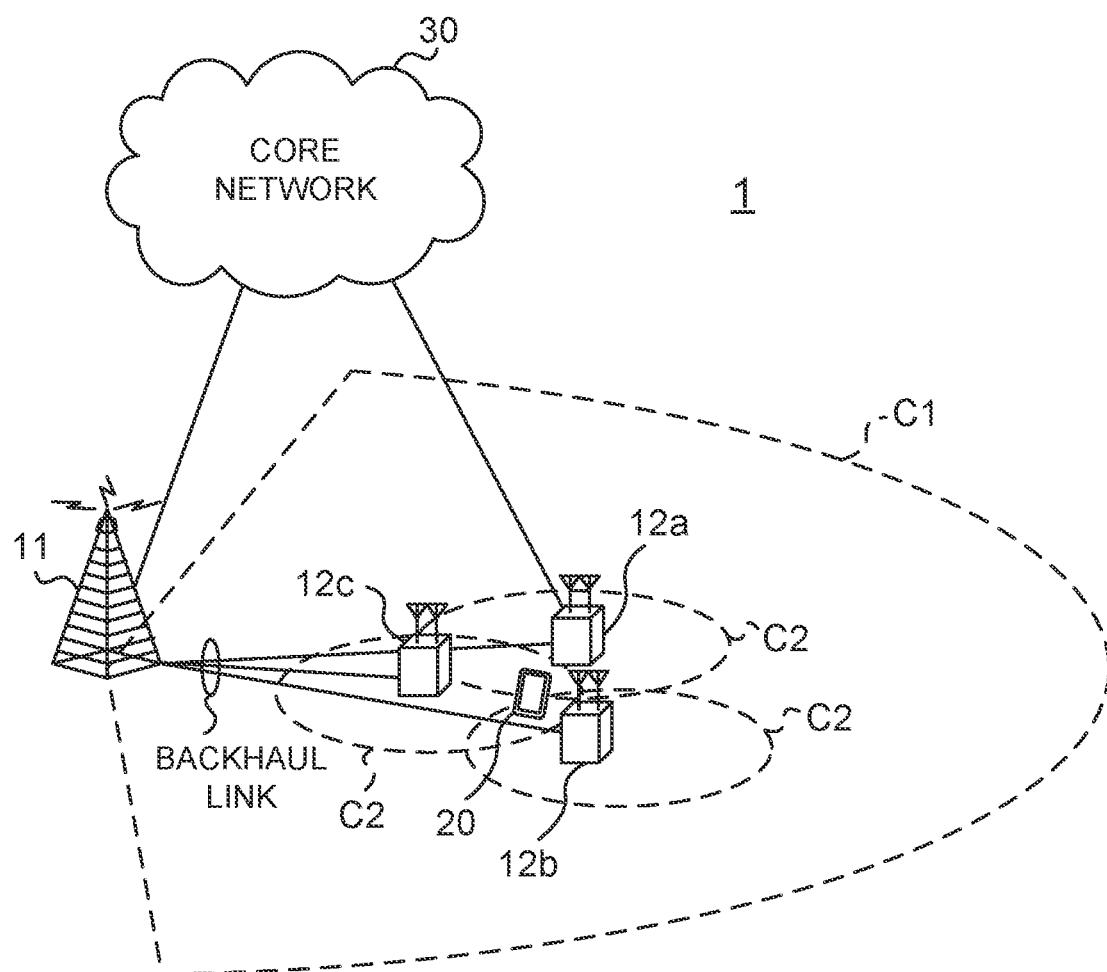
FIG. 8 is a diagram to show an example of a schematic structure of a radio communication system according to one embodiment.

FIG. 8 is a diagram to show an example of a schematic structure of the radio communication system according to one embodiment. The radio communication system 1 may be a system implementing a communication using Long Term Evolution (LTE), 5th generation mobile communication system New Radio (5G NR) and so on the specifications of which have been drafted by Third Generation Partnership Project (3GPP).

The radio communication system 1 may support dual connectivity (multi-RAT dual connectivity (MR-DC)) between a plurality of Radio Access Technologies (RATs). The MR-DC may include dual connectivity (E-UTRA-NR Dual Connectivity (EN-DC)) between LTE (Evolved Universal Terrestrial Radio Access (E-UTRA)) and NR, dual connectivity (NR-E-UTRA Dual Connectivity (NE-DC)) between NR and LTE, and so on.

In EN-DC, a base station (eNB) of LTE (E-UTRA) is a master node (MN), and a base station (gNB) of NR is a secondary node (SN). In NE-DC, a base station (gNB) of NR is an MN, and a base station (eNB) of LTE (E-UTRA) is an SN.

The radio communication system 1 may support dual connectivity between a plurality of base stations in the same RAT (for example, dual connectivity (NR-NR Dual Connectivity (NN-DC)) where both of an MN and an SN are base stations (gNB) of NR).

The radio communication system 1 may include a base station 11 that forms a macro cell C1 of a relatively wide coverage, and base stations 12 (12*a* to 12*c*) that form small cells C2, which are placed within the macro cell C1 and which are narrower than the macro cell C1. The user terminal 20 may be located in at least one cell. The arrangement, the number, and the like of each cell and user terminal 20 are by no means limited to the aspect shown in the diagram. Hereinafter, the base stations 11 and 12 will be collectively referred to as "base stations 10," unless specified otherwise.

The user terminal 20 may be connected to at least one of the plurality of base stations 10. The user terminal 20 may use at least one of carrier aggregation (CA) and dual connectivity (DC) using a plurality of component carriers (CCs).

Each CC may be included in at least one of a first frequency band (Frequency Range 1 (FR1)) and a second frequency band (Frequency Range 2 (FR2)). The macro cell C1 may be included in FR1, and the small cells C2 may be included in FR2. For example, FR1 may be a frequency band of 6 GHz or less (sub-6 GHz), and FR2 may be a frequency band which is higher than 24 GHz (above-24 GHz). Note that frequency bands, definitions and so on of FR1 and FR2 are by no means limited to these, and for example, FR1 may correspond to a frequency band which is higher than FR2.

The user terminal 20 may communicate using at least one of time division duplex (TDD) and frequency division duplex (FDD) in each CC.

The plurality of base stations (for example, RRH) 10 may be connected by a wired connection (for example, optical fiber in compliance with the Common Public Radio Interface (CPRI), the X2 interface and so on) or a wireless connection (for example, an NR communication). For example, if an NR communication is used as a backhaul between the base stations 11 and 12, the base station 11 corresponding to a higher station may be referred to as an "Integrated Access Backhaul (IAB) donor," and the base station 12 corresponding to a relay station (relay) may be referred to as an "IAB node."

The base station 10 may be connected to a core network 30 through another base station 10 or directly. For example, the core network 30 may include at least one of Evolved Packet Core (EPC), 5G Core Network (SGCN), Next Generation Core (NGC), and so on.

The user terminal 20 may be a terminal supporting at least one of communication schemes such as LTE, LTE-A, 5G, and so on.

In the radio communication system 1, an orthogonal frequency division multiplexing (OFDM)-based wireless access scheme may be used. For example, in at least one of the downlink (DL) and the uplink (UL), Cyclic Prefix OFDM (CP-OFDM), Discrete Fourier Transform Spread OFDM (DFT-s-OFDM), Orthogonal Frequency Division Multiple Access (OFDMA), Single Carrier Frequency Division Multiple Access (SC-FDMA), and so on may be used.

The wireless access scheme may be referred to as a "waveform." Note that, in the radio communication system 1, another wireless access scheme (for example, another single carrier transmission scheme, another multi-carrier transmission scheme) may be used for a wireless access scheme in the UL and the DL.

In the radio communication system 1, a downlink shared channel (Physical Downlink Shared Channel (PDSCH)), which is used by each user terminal 20 on a shared basis, a broadcast channel (Physical Broadcast Channel (PBCH)), a downlink control channel (Physical Downlink Control Channel (PDCCH)) and so on, may be used as downlink channels.

In the radio communication system 1, an uplink shared channel (Physical Uplink Shared Channel (PUSCH)), which is used by each user terminal 20 on a shared basis, an uplink control channel (Physical Uplink Control Channel (PUCCH)), a random access channel (Physical Random Access Channel (PRACH)) and so on may be used as uplink channels.

User data, higher layer control information, System Information Blocks (SIBs) and so on are communicated on the PDSCH. User data, higher layer control information and so on may be communicated on the PUSCH. The Master Information Blocks (MIBs) may be communicated on the PBCH.

Lower layer control information may be communicated on the PDCCH. For example, the lower layer control information may include downlink control information (DCI) including scheduling information of at least one of the PDSCH and the PUSCH.

Note that DCI for scheduling the PDSCH may be referred to as "DL assignment," "DL DCI," and so on, and DCI for scheduling the PUSCH may be referred to as "UL grant," "UL DCI," and so on. Note that the PDSCH may be interpreted as "DL data", and the PUSCH may be interpreted as "UL data".

For detection of the PDCCH, a control resource set (CORESET) and a search space may be used. The CORESET corresponds to a resource to search DCI. The search space corresponds to a search area and a search method of PDCCH candidates. One CORESET may be associated with one or more search spaces. The UE may monitor a CORESET associated with a certain search space, based on search space configuration.

One search space may correspond to a PDCCH candidate corresponding to one or more aggregation levels. One or more search spaces may be referred to as a "search space set." Note that a "search space," a "search space set," a "search space configuration," a "search space set configuration," a "CORESET," a "CORESET configuration" and so on of the present disclosure may be interchangeably interpreted.

Uplink control information (UCI) including at least one of channel state information (CSI), transmission confirmation information (for example, which may be also referred to as Hybrid Automatic Repeat reQuest ACKnowledgement (HARQ-ACK), ACK/NACK, and so on), and scheduling request (SR) may be communicated by means of the PUCCH. By means of the PRACH, random access preambles for establishing connections with cells may be communicated.

Note that the downlink, the uplink, and so on in the present disclosure may be expressed without a term of "link." In addition, various channels may be expressed without adding "Physical" to the head.

In the radio communication system 1, a synchronization signal (SS), a downlink reference signal (DL-RS), and so on may be communicated. In the radio communication system 1, a cell-specific reference signal (CRS), a channel state information-reference signal (CSI-RS), a demodulation reference signal (DMRS), a positioning reference signal (PRS), a phase tracking reference signal (PTRS), and so on may be communicated as the DL-RS.

For example, the synchronization signal may be at least one of a primary synchronization signal (PSS) and a secondary synchronization signal (SSS). A signal block including an SS (PSS, SSS) and a PBCH (and a DMRS for a PBCH) may be referred to as an "SS/PBCH block," an "SS Block (SSB)," and so on. Note that an SS, an SSB, and so on may be also referred to as a "reference signal."

In the radio communication system 1, a sounding reference signal (SRS), a demodulation reference signal (DMRS), and so on may be communicated as an uplink reference signal (UL-RS). Note that DMRS may be referred to as a "user terminal specific reference signal (UE-specific Reference Signal)."

(Base Station)

Figure 9:
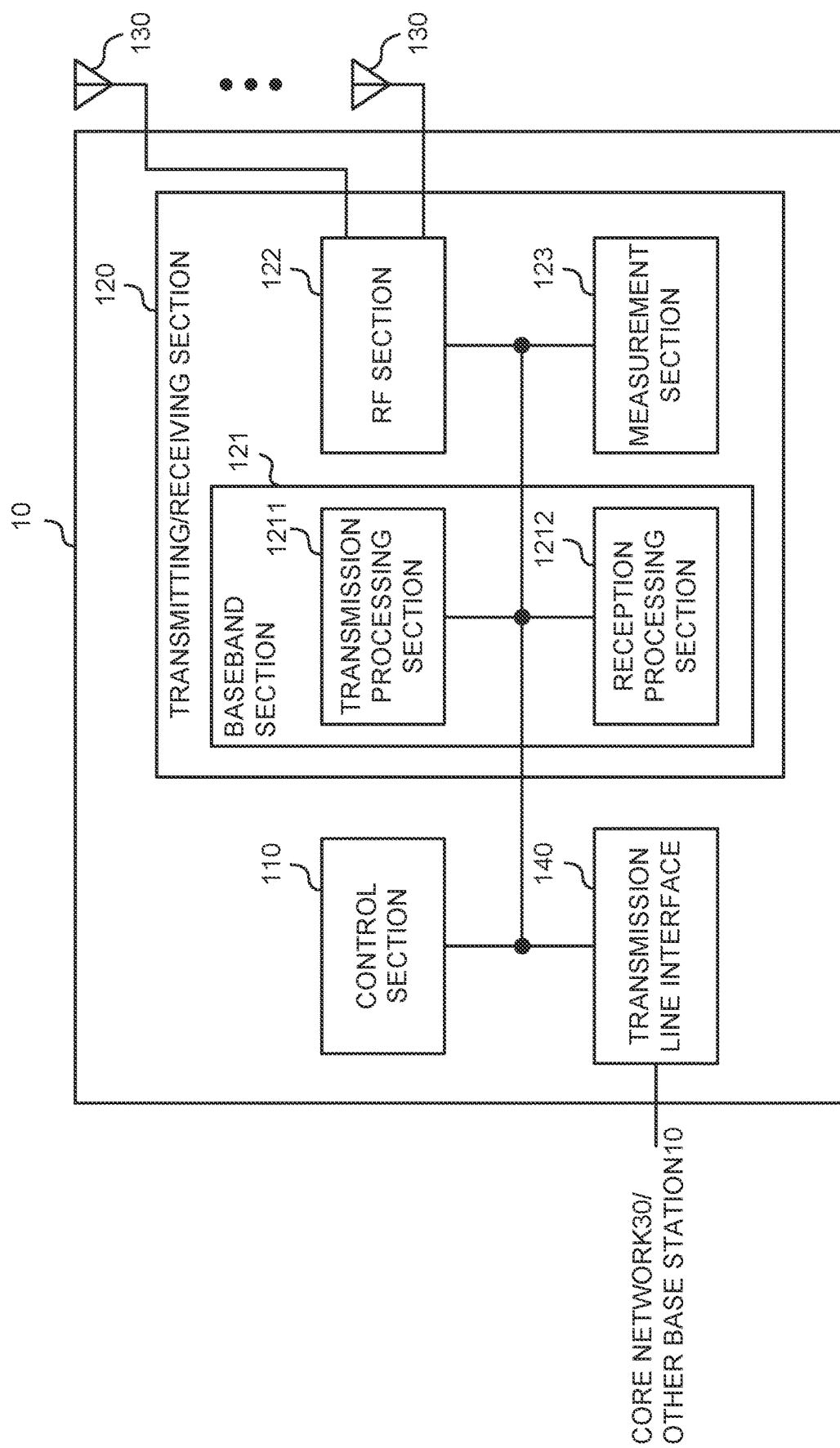
FIG. 9 is a diagram to show an example of a structure of a base station according to one embodiment.

FIG. 9 is a diagram to show an example of a structure of the base station according to one embodiment. The base station 10 includes a control section 110, a transmitting/receiving section 120, transmitting/receiving antennas 130 and a communication path interface (transmission line interface) 140. Note that the base station 10 may include one or more control sections 110, one or more transmitting/receiving sections 120, one or more transmitting/receiving antennas 130, and one or more communication path interfaces 140.

Note that, the present example primarily shows functional blocks that pertain to characteristic parts of the present embodiment, and it is assumed that the base station 10 may include other functional blocks that are necessary for radio communication as well. Part of the processes of each section described below may be omitted.

The control section 110 controls the whole of the base station 10. The control section 110 can be constituted with a controller, a control circuit, or the like described based on general understanding of the technical field to which the present disclosure pertains.

The control section 110 may control generation of signals, scheduling (for example, resource allocation, mapping), and so on. The control section 110 may control transmission and reception, measurement and so on using the transmitting/receiving section 120, the transmitting/receiving antennas 130, and the communication path interface 140. The control section 110 may generate data, control information, a sequence and so on to transmit as a signal, and forward the generated items to the transmitting/receiving section 120. The control section 110 may perform call processing (setting up, releasing) for communication channels, manage the state of the base station 10, and manage the radio resources.

The transmitting/receiving section 120 may include a baseband section 121, a Radio Frequency (RF) section 122, and a measurement section 123. The baseband section 121 may include a transmission processing section 1211 and a reception processing section 1212. The transmitting/receiving section 120 can be constituted with a transmitter/receiver, an RF circuit, a baseband circuit, a filter, a phase shifter, a measurement circuit, a transmitting/receiving circuit, or the like described based on general understanding of the technical field to which the present disclosure pertains.

The transmitting/receiving section 120 may be structured as a transmitting/receiving section in one entity, or may be constituted with a transmitting section and a receiving section. The transmitting section may be constituted with the transmission processing section 1211, and the RF section 122. The receiving section may be constituted with the reception processing section 1212, the RF section 122, and the measurement section 123.

The transmitting/receiving antennas 130 can be constituted with antennas, for example, an array antenna, or the like described based on general understanding of the technical field to which the present disclosure pertains.

The transmitting/receiving section 120 may transmit the above-described downlink channel, synchronization signal, downlink reference signal, and so on. The transmitting/receiving section 120 may receive the above-described uplink channel, uplink reference signal, and so on.

The transmitting/receiving section 120 may form at least one of a transmit beam and a receive beam by using digital beam forming (for example, precoding), analog beam forming (for example, phase rotation), and so on.

The transmitting/receiving section 120 (transmission processing section 1211) may perform the processing of the Packet Data Convergence Protocol (PDCP) layer, the processing of the Radio Link Control (RLC) layer (for example, RLC retransmission control), the processing of the Medium Access Control (MAC) layer (for example, HARQ retransmission control), and so on, for example, on data and control information and so on acquired from the control section 110, and may generate bit string to transmit.

The transmitting/receiving section 120 (transmission processing section 1211) may perform transmission processing such as channel coding (which may include error correction coding), modulation, mapping, filtering, discrete Fourier transform (DFT) processing (as necessary), inverse fast Fourier transform (IFFT) processing, precoding, digital-to-analog conversion, and so on, on the bit string to transmit, and output a baseband signal.

The transmitting/receiving section 120 (RF section 122) may perform modulation to a radio frequency band, filtering, amplification, and so on, on the baseband signal, and transmit the signal of the radio frequency band through the transmitting/receiving antennas 130.

On the other hand, the transmitting/receiving section 120 (RF section 122) may perform amplification, filtering, demodulation to a baseband signal, and so on, on the signal of the radio frequency band received by the transmitting/receiving antennas 130.

The transmitting/receiving section 120 (reception processing section 1212) may apply reception processing such as analog-digital conversion, fast Fourier transform (FFT) processing, inverse discrete Fourier transform (IDFT) processing (as necessary), filtering, de-mapping, demodulation, decoding (which may include error correction decoding), MAC layer processing, the processing of the RLC layer and the processing of the PDCP layer, and so on, on the acquired baseband signal, and acquire user data, and so on.

The transmitting/receiving section 120 (measurement section 123) may perform the measurement related to the received signal. For example, the measurement section 123 may perform Radio Resource Management (RRM) measurement, Channel State Information (CSI) measurement, and so on, based on the received signal. The measurement section 123 may measure a received power (for example, Reference Signal Received Power (RSRP)), a received quality (for example, Reference Signal Received Quality (RSRQ), a Signal to Interference plus Noise Ratio (SINR), a Signal to Noise Ratio (SNR)), a signal strength (for example, Received Signal Strength Indicator (RSSI)), channel information (for example, CSI), and so on. The measurement results may be output to the control section 110.

The communication path interface 140 may perform transmission/reception (backhaul signaling) of a signal with an apparatus included in the core network 30 or other base stations 10, and so on, and acquire or transmit user data (user plane data), control plane data, and so on for the user terminal 20.

Note that the transmitting section and the receiving section of the base station 10 in the present disclosure may be constituted with at least one of the transmitting/receiving section 120, the transmitting/receiving antennas 130, and the communication path interface 140.

The transmitting/receiving section 120 may transmit single downlink control information (DCI) for a plurality of uplink shared channels (Physical Uplink Shared Channels (PUSCHs)). The control section 110 may control reception of the PUSCHs transmitted on the basis of an extended precoding information and number of layers field included in the DCI. The control section 110 may independently configure the number of antenna ports for each of the plurality of PUSCHs (the first and second embodiments).

User Terminal

Figure 10:
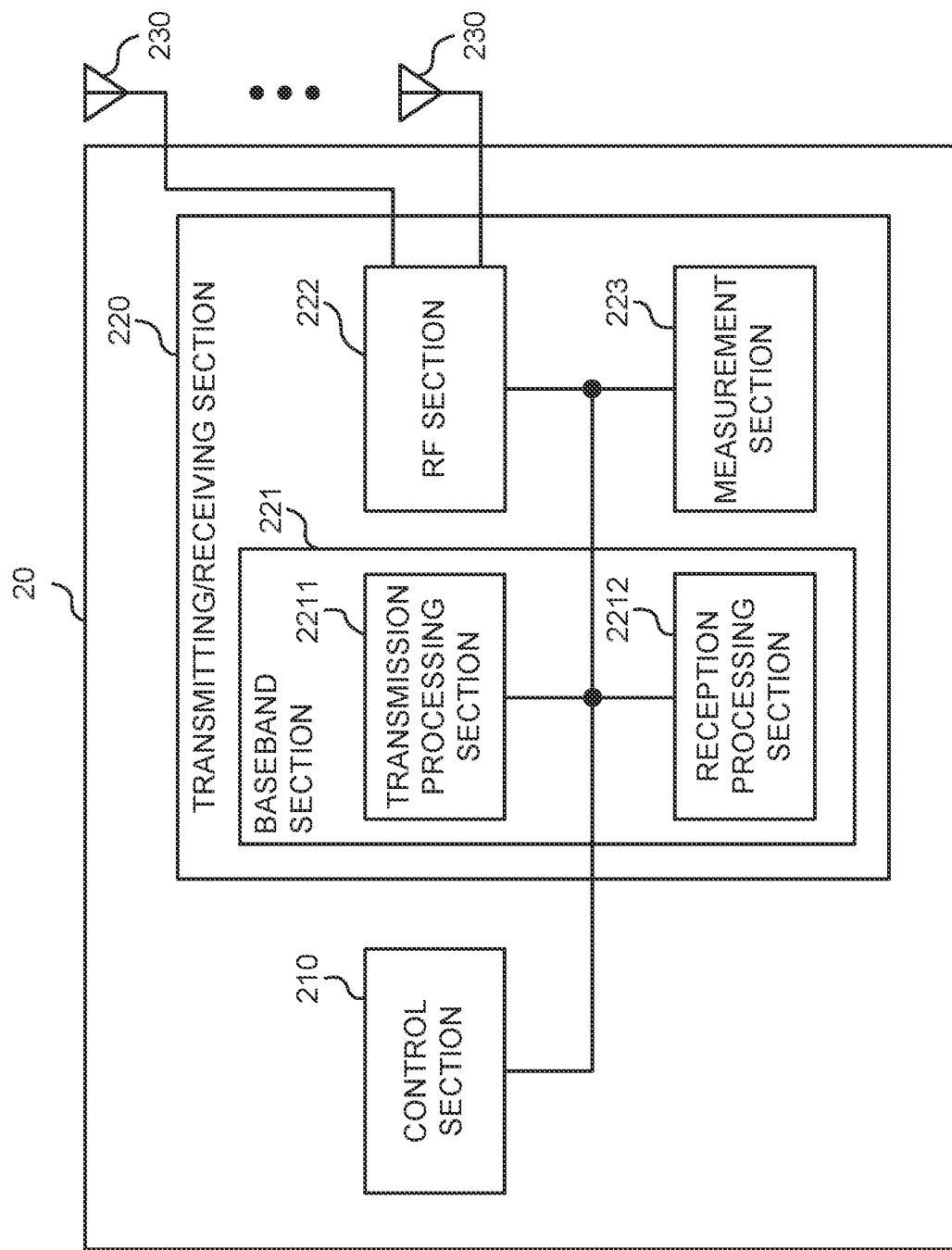
FIG. 10 is a diagram to show an example of a structure of a user terminal according to one embodiment.

FIG. 10 is a diagram to show an example of a structure of the user terminal according to one embodiment. The user terminal 20 includes a control section 210, a transmitting/receiving section 220, and transmitting/receiving antennas 230. Note that the user terminal 20 may include one or more control sections 210, one or more transmitting/receiving sections 220, and one or more transmitting/receiving antennas 230.

Note that, the present example primarily shows functional blocks that pertain to characteristic parts of the present embodiment, and it is assumed that the user terminal 20 may include other functional blocks that are necessary for radio communication as well. Part of the processes of each section described below may be omitted.

The control section 210 controls the whole of the user terminal 20. The control section 210 can be constituted with a controller, a control circuit, or the like described based on general understanding of the technical field to which the present disclosure pertains.

The control section 210 may control generation of signals, mapping, and so on. The control section 210 may control transmission/reception, measurement and so on using the transmitting/receiving section 220, and the transmitting/receiving antennas 230. The control section 210 generates data, control information, a sequence and so on to transmit as a signal, and may forward the generated items to the transmitting/receiving section 220.

The transmitting/receiving section 220 may include a baseband section 221, an RF section 222, and a measurement section 223. The baseband section 221 may include a transmission processing section 2211 and a reception processing section 2212. The transmitting/receiving section 220 can be constituted with a transmitter/receiver, an RF circuit, a baseband circuit, a filter, a phase shifter, a measurement circuit, a transmitting/receiving circuit, or the like described based on general understanding of the technical field to which the present disclosure pertains.

The transmitting/receiving section 220 may be structured as a transmitting/receiving section in one entity, or may be constituted with a transmitting section and a receiving section. The transmitting section may be constituted with the transmission processing section 2211 and the RF section 222. The receiving section may be constituted with the reception processing section 2212, the RF section 222, and the measurement section 223.

The transmitting/receiving antennas 230 can be constituted with antennas, for example, an array antenna, or the like described based on general understanding of the technical field to which the present disclosure pertains.

The transmitting/receiving section 220 may receive the above-described downlink channel, synchronization signal, downlink reference signal, and so on. The transmitting/receiving section 220 may transmit the above-described uplink channel, uplink reference signal, and so on.

The transmitting/receiving section 220 may form at least one of a transmit beam and a receive beam by using digital beam forming (for example, precoding), analog beam forming (for example, phase rotation), and so on.

The transmitting/receiving section 220 (transmission processing section 2211) may perform the processing of the PDCP layer, the processing of the RLC layer (for example, RLC retransmission control), the processing of the MAC layer (for example, HARQ retransmission control), and so on, for example, on data and control information and so on acquired from the control section 210, and may generate bit string to transmit.

The transmitting/receiving section 220 (transmission processing section 2211) may perform transmission processing such as channel coding (which may include error correction coding), modulation, mapping, filtering, DFT processing (as necessary), IFFT processing, precoding, digital-to-analog conversion, and so on, on the bit string to transmit, and output a baseband signal.

Note that, whether to apply DFT processing or not may be based on the configuration of the transform precoding. The transmitting/receiving section 220 (transmission processing section 2211) may perform, for a certain channel (for example, PUSCH), the DFT processing as the above-described transmission processing to transmit the channel by using a DFT-s-OFDM waveform if transform precoding is enabled, and otherwise, does not need to perform the DFT processing as the above-described transmission process.

The transmitting/receiving section 220 (RF section 222) may perform modulation to a radio frequency band, filtering, amplification, and so on, on the baseband signal, and transmit the signal of the radio frequency band through the transmitting/receiving antennas 230.

On the other hand, the transmitting/receiving section 220 (RF section 222) may perform amplification, filtering, demodulation to a baseband signal, and so on, on the signal of the radio frequency band received by the transmitting/receiving antennas 230.

The transmitting/receiving section 220 (reception processing section 2212) may apply a receiving process such as analog-digital conversion, FFT processing, IDFT processing (as necessary), filtering, de-mapping, demodulation, decoding (which may include error correction decoding), MAC layer processing, the processing of the RLC layer and the processing of the PDCP layer, and so on, on the acquired baseband signal, and acquire user data, and so on.

The transmitting/receiving section 220 (measurement section 223) may perform the measurement related to the received signal. For example, the measurement section 223 may perform RRM measurement, CSI measurement, and so on, based on the received signal. The measurement section 223 may measure a received power (for example, RSRP), a received quality (for example, RSRQ, SINR, SNR), a signal strength (for example, RSSI), channel information (for example, CSI), and so on. The measurement results may be output to the control section 210.

Note that the transmitting section and the receiving section of the user terminal 20 in the present disclosure may be constituted with at least one of the transmitting/receiving section 220 and the transmitting/receiving antennas 230.

The transmitting/receiving section 220 may receive single downlink control information (DCI) for a plurality of uplink shared channels (Physical Uplink Shared Channels (PUSCHs)). The control section 210 may control transmission of the PUSCHs on the basis of an extended precoding information and number of layers field included in the DCI. The control section 210 may assume that the number of antenna ports is independently configured for each of the plurality of PUSCHs (the first and second embodiments).

The control section 210 may control transmission of the PUSCHs on the basis of spatial relation information (SRI) corresponding to each specific number of bits of the extended precoding information and number of layers field divided by the specific number of bits (the first and second embodiments).

The control section 210 may determine the number of bits of the extended precoding information and number of layers field on the basis of at least one of a number configured on the basis of a specific higher layer parameter, the number of the PUSCHs, and the number of pieces of spatial relation information (SRI) (the first and second embodiments).

The control section 210 may perform control so as to report capability information defined as information related to whether to use different antenna ports for the plurality of PUSCHs or whether different transmitted precoding matrix indicators are indicated for the plurality of PUSCHs (the third embodiment).

Hardware Structure

Note that the block diagrams that have been used to describe the above embodiments show blocks in functional units. These functional blocks (components) may be implemented in arbitrary combinations of at least one of hardware and software. Also, the method for implementing each functional block is not particularly limited. That is, each functional block may be realized by one piece of apparatus that is physically or logically coupled, or may be realized by directly or indirectly connecting two or more physically or logically separate pieces of apparatus (for example, via wire, wireless, or the like) and using these plurality of pieces of apparatus. The functional blocks may be implemented by combining softwares into the apparatus described above or the plurality of apparatuses described above.

Here, functions include judgment, determination, decision, calculation, computation, processing, derivation, investigation, search, confirmation, reception, transmission, output, access, resolution, selection, designation, establishment, comparison, assumption, expectation, considering, broadcasting, notifying, communicating, forwarding, configuring, reconfiguring, allocating (mapping), assigning, and the like, but function are by no means limited to these. For example, functional block (components) to implement a function of transmission may be referred to as a "transmitting section (transmitting unit)," a "transmitter," and the like. The method for implementing each component is not particularly limited as described above.

Figure 11:
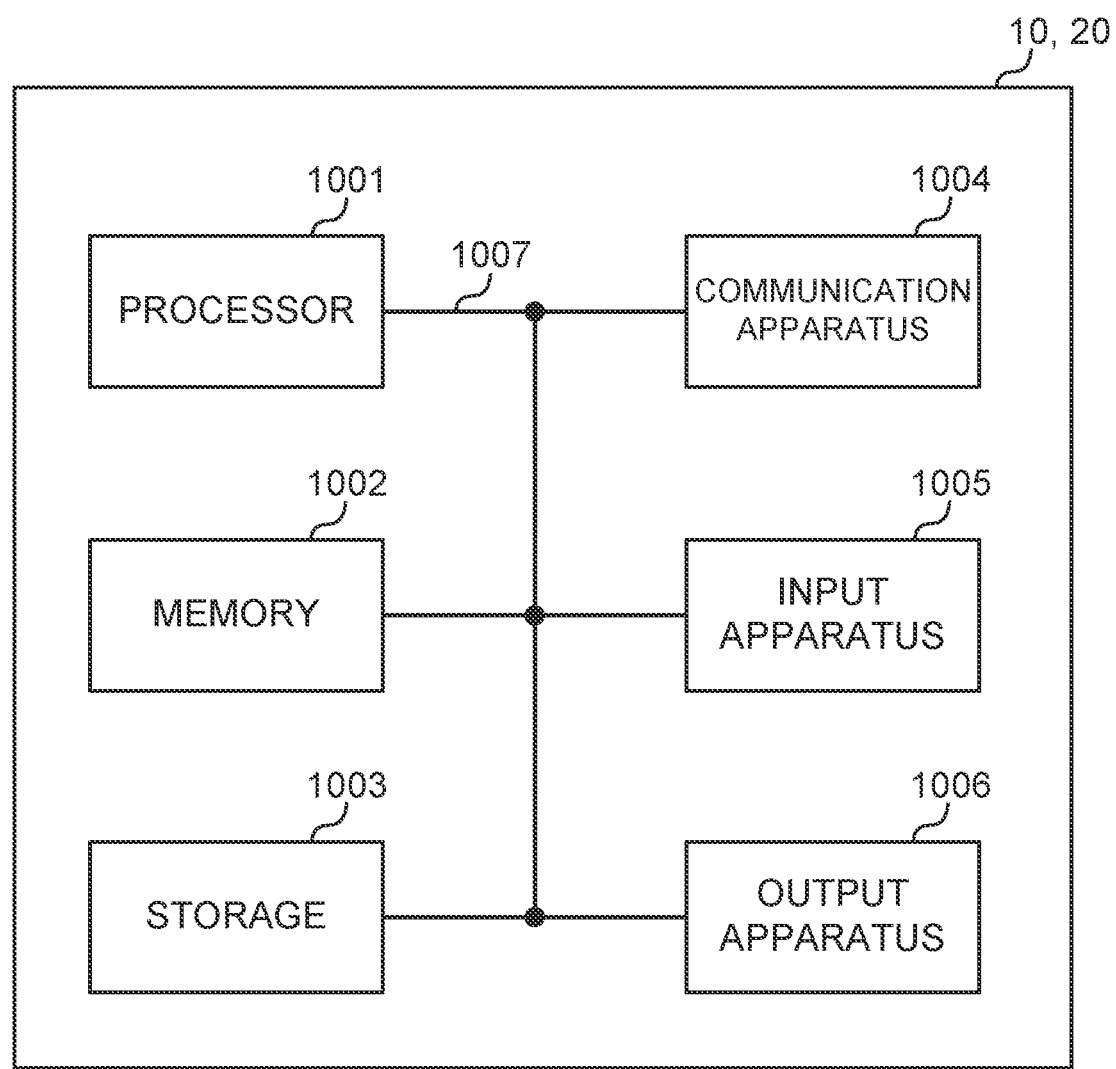
FIG. 11 is a diagram to show an example of a hardware structure of the base station and the user terminal according to one embodiment.

For example, a base station, a user terminal, and so on according to one embodiment of the present disclosure may function as a computer that executes the processes of the radio communication method of the present disclosure. FIG. 11 is a diagram to show an example of a hardware structure of the base station and the user terminal according to one embodiment. Physically, the above-described base station 10 and user terminal 20 may each be formed as a computer apparatus that includes a processor 1001, a memory 1002, a storage 1003, a communication apparatus 1004, an input apparatus 1005, an output apparatus 1006, a bus 1007, and so on.

Note that in the present disclosure, the words such as an apparatus, a circuit, a device, a section, a unit, and so on can be interchangeably interpreted. The hardware structure of the base station 10 and the user terminal 20 may be configured to include one or more of apparatuses shown in the drawings, or may be configured not to include part of apparatuses.

For example, although only one processor 1001 is shown, a plurality of processors may be provided. Furthermore, processes may be implemented with one processor or may be implemented at the same time, in sequence, or in different manners with two or more processors. Note that the processor 1001 may be implemented with one or more chips.

Each function of the base station 10 and the user terminals 20 is implemented, for example, by allowing certain software (programs) to be read on hardware such as the processor 1001 and the memory 1002, and by allowing the processor 1001 to perform calculations to control communication via the communication apparatus 1004 and control at least one of reading and writing of data in the memory 1002 and the storage 1003.

The processor 1001 controls the whole computer by, for example, running an operating system. The processor 1001 may be configured with a central processing unit (CPU), which includes interfaces with peripheral apparatus, control apparatus, computing apparatus, a register, and so on. For example, at least part of the above-described control section 110 (210), the transmitting/receiving section 120 (220), and so on may be implemented by the processor 1001.

Furthermore, the processor 1001 reads programs (program codes), software modules, data, and so on from at least one of the storage 1003 and the communication apparatus 1004, into the memory 1002, and executes various processes according to these. As for the programs, programs to allow computers to execute at least part of the operations of the above-described embodiments are used. For example, the control section 110 (210) may be implemented by control programs that are stored in the memory 1002 and that operate on the processor 1001, and other functional blocks may be implemented likewise.

The memory 1002 is a computer-readable recording medium, and may be constituted with, for example, at least one of a Read Only Memory (ROM), an Erasable Programmable ROM (EPROM), an Electrically EPROM (EEPROM), a Random Access Memory (RAM), and other appropriate storage media. The memory 1002 may be referred to as a "register," a "cache," a "main memory (primary storage apparatus)" and so on. The memory 1002 can store executable programs (program codes), software modules, and the like for implementing the radio communication method according to one embodiment of the present disclosure.

The storage 1003 is a computer-readable recording medium, and may be constituted with, for example, at least one of a flexible disk, a floppy (registered trademark) disk, a magneto-optical disk (for example, a compact disc (Compact Disc ROM (CD-ROM) and so on), a digital versatile disc, a Blu-ray (registered trademark) disk), a removable disk, a hard disk drive, a smart card, a flash memory device (for example, a card, a stick, and a key drive), a magnetic stripe, a database, a server, and other appropriate storage media. The storage 1003 may be referred to as "secondary storage apparatus."

The communication apparatus 1004 is hardware (transmitting/receiving device) for allowing inter-computer communication via at least one of wired and wireless networks, and may be referred to as, for example, a "network device," a "network controller," a "network card," a "communication module," and so on. The communication apparatus 1004 may be configured to include a high frequency switch, a duplexer, a filter, a frequency synthesizer, and so on in order to realize, for example, at least one of frequency division duplex (FDD) and time division duplex (TDD). For example, the above-described transmitting/receiving section 120 (220), the transmitting/receiving antennas 130 (230), and so on may be implemented by the communication apparatus 1004. In the transmitting/receiving section 120 (220), the transmitting section 120a (220a) and the receiving section 120b (220b) can be implemented while being separated physically or logically.

The input apparatus 1005 is an input device that receives input from the outside (for example, a keyboard, a mouse, a microphone, a switch, a button, a sensor, and so on). The output apparatus 1006 is an output device that allows sending output to the outside (for example, a display, a speaker, a Light Emitting Diode (LED) lamp, and so on). Note that the input apparatus 1005 and the output apparatus 1006 may be provided in an integrated structure (for example, a touch panel).

Furthermore, these types of apparatus, including the processor 1001, the memory 1002, and others, are connected by a bus 1007 for communicating information. The bus 1007 may be formed with a single bus, or may be formed with buses that vary between pieces of apparatus.

Also, the base station 10 and the user terminals 20 may be structured to include hardware such as a microprocessor, a digital signal processor (DSP), an Application Specific Integrated Circuit (ASIC), a Programmable Logic Device (PLD), a Field Programmable Gate Array (FPGA), and so on, and part or all of the functional blocks may be implemented by the hardware. For example, the processor 1001 may be implemented with at least one of these pieces of hardware.

Variations

Note that the terminology described in the present disclosure and the terminology that is needed to understand the present disclosure may be replaced by other terms that convey the same or similar meanings. For example, a "channel," a "symbol," and a "signal" (or signaling) may be interchangeably interpreted. Also, "signals" may be "messages." A reference signal may be abbreviated as an "RS," and may be referred to as a "pilot," a "pilot signal," and so on, depending on which standard applies. Furthermore, a "component carrier (CC)" may be referred to as a "cell," a "frequency carrier," a "carrier frequency" and so on.

A radio frame may be constituted of one or a plurality of periods (frames) in the time domain. Each of one or a plurality of periods (frames) constituting a radio frame may be referred to as a "subframe." Furthermore, a subframe may be constituted of one or a plurality of slots in the time domain. A subframe may be a fixed time length (for example, 1 ms) independent of numerology.

Here, numerology may be a communication parameter applied to at least one of transmission and reception of a certain signal or channel. For example, numerology may indicate at least one of a subcarrier spacing (SCS), a bandwidth, a symbol length, a cyclic prefix length, a transmission time interval (TTI), the number of symbols per TTI, a radio frame structure, a particular filter processing performed by a transceiver in the frequency domain, a particular windowing processing performed by a transceiver in the time domain, and so on.

A slot may be constituted of one or a plurality of symbols in the time domain (Orthogonal Frequency Division Multiplexing (OFDM) symbols, Single Carrier Frequency Division Multiple Access (SC-FDMA) symbols, and so on). Furthermore, a slot may be a time unit based on numerology.

A slot may include a plurality of mini-slots. Each mini-slot may be constituted of one or a plurality of symbols in the time domain. A mini-slot may be referred to as a "sub-slot." A mini-slot may be constituted of symbols less than the number of slots. A PDSCH (or PUSCH) transmitted in a time unit larger than a mini-slot may be referred to as "PDSCH (PUSCH) mapping type A." A PDSCH (or PUSCH) transmitted using a mini-slot may be referred to as "PDSCH (PUSCH) mapping type B."

A radio frame, a subframe, a slot, a mini-slot, and a symbol all express time units in signal communication. A radio frame, a subframe, a slot, a mini-slot, and a symbol may each be called by other applicable terms. Note that time units such as a frame, a subframe, a slot, mini-slot, and a symbol in the present disclosure may be interchangeably interpreted.

For example, one subframe may be referred to as a "TTI," a plurality of consecutive subframes may be referred to as a "TTI," or one slot or one mini-slot may be referred to as a "TTI." That is, at least one of a subframe and a TTI may be a subframe (1 ms) in existing LTE, may be a shorter period than 1 ms (for example, 1 to 13 symbols), or may be a longer period than 1 ms. Note that a unit expressing TTI may be referred to as a "slot," a "mini-slot," and so on instead of a "subframe."

Here, a TTI refers to the minimum time unit of scheduling in radio communication, for example. For example, in LTE systems, a base station schedules the allocation of radio resources (such as a frequency bandwidth and transmit power that are available for each user terminal) for the user terminal in TTI units. Note that the definition of TTIs is not limited to this.

TTIs may be transmission time units for channel-encoded data packets (transport blocks), code blocks, or codewords, or may be the unit of processing in scheduling, link adaptation, and so on. Note that, when TTIs are given, the time interval (for example, the number of symbols) to which transport blocks, code blocks, codewords, or the like are actually mapped may be shorter than the TTIs.

Note that, in the case where one slot or one mini-slot is referred to as a TTI, one or more TTIs (that is, one or more slots or one or more mini-slots) may be the minimum time unit of scheduling. Furthermore, the number of slots (the number of mini-slots) constituting the minimum time unit of the scheduling may be controlled.

A TTI having a time length of 1 ms may be referred to as a "normal TTI" (TTI in 3GPP Rel. 8 to Rel. 12), a "long TTI," a "normal subframe," a "long subframe," a "slot" and so on. A TTI that is shorter than a normal TTI may be referred to as a "shortened TTI," a "short TTI," a "partial or fractional TTI," a "shortened subframe," a "short subframe," a "mini-slot," a "sub-slot," a "slot" and so on.

Note that a long TTI (for example, a normal TTI, a subframe, and so on) may be interpreted as a TTI having a time length exceeding 1 ms, and a short TTI (for example, a shortened TTI and so on) may be interpreted as a TTI having a TTI length shorter than the TTI length of a long TTI and equal to or longer than 1 ms.

A resource block (RB) is the unit of resource allocation in the time domain and the frequency domain, and may include one or a plurality of consecutive subcarriers in the frequency domain. The number of subcarriers included in an RB may be the same regardless of numerology, and, for example, may be 12. The number of subcarriers included in an RB may be determined based on numerology.

Also, an RB may include one or a plurality of symbols in the time domain, and may be one slot, one mini-slot, one subframe, or one TTI in length. One TTI, one subframe, and so on each may be constituted of one or a plurality of resource blocks.

Note that one or a plurality of RBs may be referred to as a "physical resource block (Physical RB (PRB))," a "subcarrier group (SCG)," a "resource element group (REG)," a "PRB pair," an "RB pair" and so on.

Furthermore, a resource block may be constituted of one or a plurality of resource elements (REs). For example, one RE may correspond to a radio resource field of one subcarrier and one symbol.

A bandwidth part (BWP) (which may be referred to as a "fractional bandwidth," and so on) may represent a subset of contiguous common resource blocks (common RBs) for certain numerology in a certain carrier. Here, a common RB may be specified by an index of the RB based on the common reference point of the carrier. A PRB may be defined by a certain BWP and may be numbered in the BWP.

The BWP may include a UL BWP (BWP for the UL) and a DL BWP (BWP for the DL). One or a plurality of BWPs may be configured in one carrier for a UE.

At least one of configured BWPs may be active, and a UE need not assume that a certain signal/channel is transmitted/received outside the active BWPs. Note that a "cell," a "carrier," and so on in the present disclosure may be interpreted as a "BWP".

Note that the above-described structures of radio frames, subframes, slots, mini-slots, symbols, and so on are merely examples. For example, structures such as the number of subframes included in a radio frame, the number of slots per subframe or radio frame, the number of mini-slots included in a slot, the numbers of symbols and RBs included in a slot or a mini-slot, the number of subcarriers included in an RB, the number of symbols in a TTI, the symbol length, the cyclic prefix (CP) length, and so on can be variously changed.

Also, the information, parameters, and so on described in the present disclosure may be represented in absolute values or in relative values with respect to certain values, or may be represented in another corresponding information. For example, radio resources may be specified by certain indices.

The names used for parameters and so on in the present disclosure are in no respect limiting. Furthermore, mathematical expressions that use these parameters, and so on may be different from those expressly disclosed in the present disclosure. For example, since various channels (PUCCH, PDCCH, and so on) and information elements can be identified by any suitable names, the various names allocated to these various channels and information elements are in no respect limiting.

The information, signals, and so on described in the present disclosure may be represented by using any of a variety of different technologies. For example, data, instructions, commands, information, signals, bits, symbols, chips, and so on, all of which may be referenced throughout the herein-contained description, may be represented by voltages, currents, electromagnetic waves, magnetic fields or particles, optical fields or photons, or any combination of these.

Also, information, signals, and so on can be output in at least one of from higher layers to lower layers and from lower layers to higher layers. Information, signals, and so on may be input and/or output via a plurality of network nodes.

The information, signals, and so on that are input and/or output may be stored in a specific location (for example, a memory) or may be managed by using a management table. The information, signals, and so on to be input and/or output can be overwritten, updated, or appended. The information, signals, and so on that are output may be deleted. The information, signals, and so on that are input may be transmitted to another apparatus.

Reporting of information is by no means limited to the aspects/embodiments described in the present disclosure, and other methods may be used as well. For example, reporting of information in the present disclosure may be implemented by using physical layer signaling (for example, downlink control information (DCI), uplink control information (UCI), higher layer signaling (for example, Radio Resource Control (RRC) signaling, broadcast information (master information block (MIB), system information blocks (SIBs), and so on), Medium Access Control (MAC) signaling and so on), and other signals or combinations of these.

Note that physical layer signaling may be referred to as "Layer 1/Layer 2 (L1/L2) control information (L1/L2 control signals)," "L1 control information (L1 control signal)," and so on. Also, RRC signaling may be referred to as an "RRC message," and can be, for example, an RRC connection setup message, an RRC connection reconfiguration message, and so on. Also, MAC signaling may be reported using, for example, MAC control elements (MAC CEs).

Also, reporting of certain information (for example, reporting of "X holds") does not necessarily have to be reported explicitly, and can be reported implicitly (by, for example, not reporting this certain information or reporting another piece of information).

Determinations may be made in values represented by one bit (0 or 1), may be made in Boolean values that represent true or false, or may be made by comparing numerical values (for example, comparison against a certain value).

Software, whether referred to as "software," "firmware," "middleware," "microcode," or "hardware description language," or called by other terms, should be interpreted broadly to mean instructions, instruction sets, code, code segments, program codes, programs, subprograms, software modules, applications, software applications, software packages, routines, subroutines, objects, executable files, execution threads, procedures, functions, and so on.

Also, software, commands, information, and so on may be transmitted and received via communication media. For example, when software is transmitted from a website, a server, or other remote sources by using at least one of wired technologies (coaxial cables, optical fiber cables, twistedpair cables, digital subscriber lines (DSL), and so on) and wireless technologies (infrared radiation, microwaves, and so on), at least one of these wired technologies and wireless technologies are also included in the definition of communication media.

The terms "system" and "network" used in the present disclosure can be used interchangeably. The "network" may mean an apparatus (for example, a base station) included in the network.

In the present disclosure, the terms such as "precoding," a "precoder," a "weight (precoding weight)," "quasi-co-location (QCL)," a "Transmission Configuration Indication state (TCI state)," a "spatial relation," a "spatial domain filter," a "transmit power," "phase rotation," an "antenna port," an "antenna port group," a "layer," "the number of layers," a "rank," a "resource," a "resource set," a "resource group," a "beam," a "beam width," a "beam angular degree," an "antenna," an "antenna element," a "panel," and so on can be used interchangeably.

In the present disclosure, the terms such as a "base station (BS)," a "radio base station," a "fixed station," a "NodeB," an "eNB (eNodeB)," a "gNB (gNodeB)," an "access point," a "transmission point (TP)," a "reception point (RP)," a "transmission/reception point (TRP)," a "panel," a "cell," a "sector," a "cell group," a "carrier," a "component carrier," and so on can be used interchangeably. The base station may be referred to as the terms such as a "macro cell," a small cell," a "femto cell," a "pico cell," and so on.

A base station can accommodate one or a plurality of (for example, three) cells. When a base station accommodates a plurality of cells, the entire coverage area of the base station can be partitioned into multiple smaller areas, and each smaller area can provide communication services through base station subsystems (for example, indoor small base stations (Remote Radio Heads (RRHs))). The term "cell" or "sector" refers to part of or the entire coverage area of at least one of a base station and a base station subsystem that provides communication services within this coverage.

In the present disclosure, the terms "mobile station (MS)," "user terminal," "user equipment (UE)," and "terminal" may be used interchangeably.

A mobile station may be referred to as a "subscriber station," "mobile unit," "subscriber unit," "wireless unit," "remote unit," "mobile device," "wireless device," "wireless communication device," "remote device," "mobile subscriber station," "access terminal," "mobile terminal," "wireless terminal," "remote terminal," "handset," "user agent," "mobile client," "client," or some other appropriate terms in some cases.

At least one of a base station and a mobile station may be referred to as a "transmitting apparatus," a "receiving apparatus," a "radio communication apparatus," and so on. Note that at least one of a base station and a mobile station may be device mounted on a mobile body or a mobile body itself, and so on. The mobile body may be a vehicle (for example, a car, an airplane, and the like), may be a mobile body which moves unmanned (for example, a drone, an automatic operation car, and the like), or may be a robot (a manned type or unmanned type). Note that at least one of a base station and a mobile station also includes an apparatus which does not necessarily move during communication operation. For example, at least one of a base station and a mobile station may be an Internet of Things (IoT) device such as a sensor, and the like.

Furthermore, the base station in the present disclosure may be interpreted as a user terminal. For example, each aspect/embodiment of the present disclosure may be applied to the structure that replaces a communication between a base station and a user terminal with a communication between a plurality of user terminals (for example, which may be referred to as "Device-to-Device (D2D)," "Vehicle-to-Everything (V2X)," and the like). In this case, user terminals 20 may have the functions of the base stations 10 described above. The words "uplink" and "downlink" may be interpreted as the words corresponding to the terminal-to-terminal communication (for example, "side"). For example, an uplink channel, a downlink channel and so on may be interpreted as a side channel.

Likewise, the user terminal in the present disclosure may be interpreted as base station. In this case, the base station 10 may have the functions of the user terminal 20 described above.

Actions which have been described in the present disclosure to be performed by a base station may, in some cases, be performed by upper nodes. In a network including one or a plurality of network nodes with base stations, it is clear that various operations that are performed to communicate with terminals can be performed by base stations, one or more network nodes (for example, Mobility Management Entities (MMEs), Serving-Gateways (S-GWs), and so on may be possible, but these are not limiting) other than base stations, or combinations of these.

The aspects/embodiments illustrated in the present disclosure may be used individually or in combinations, which may be switched depending on the mode of implementation. The order of processes, sequences, flowcharts, and so on that have been used to describe the aspects/embodiments in the present disclosure may be re-ordered as long as inconsistencies do not arise. For example, although various methods have been illustrated in the present disclosure with various components of steps in exemplary orders, the specific orders that are illustrated herein are by no means limiting.

The aspects/embodiments illustrated in the present disclosure may be applied to Long Term Evolution (LTE), LTE-Advanced (LTE-A), LTE-Beyond (LTE-B), SUPER 3G, IMT-Advanced, 4th generation mobile communication system (4G), 5th generation mobile communication system (5G), 6th generation mobile communication system (6G), xth generation mobile communication system (xG) (xG (where x is, for example, an integer or a decimal)), Future Radio Access (FRA), New-Radio Access Technology (RAT), New Radio (NR), New radio access (NX), Future generation radio access (FX), Global System for Mobile communications (GSM (registered trademark)), CDMA 2000, Ultra Mobile Broadband (UMB), IEEE 802.11 (Wi-Fi (registered trademark)), IEEE 802.16 (WiMAX (registered trademark)), IEEE 802.20, Ultra-WideBand (UWB), Bluetooth (registered trademark), systems that use other adequate radio communication methods and next-generation systems that are enhanced based on these. A plurality of systems may be combined (for example, a combination of LTE or LTE-A and 5G, and the like) and applied.

The phrase "based on" (or "on the basis of") as used in the present disclosure does not mean "based only on" (or "only on the basis of"), unless otherwise specified. In other words, the phrase "based on" (or "on the basis of") means both "based only on" and "based at least on" ("only on the basis of" and "at least on the basis of").

Reference to elements with designations such as "first," "second," and so on as used in the present disclosure does not generally limit the quantity or order of these elements. These designations may be used in the present disclosure only for convenience, as a method for distinguishing between two or more elements. Thus, reference to the first and second elements does not imply that only two elements may be employed, or that the first element must precede the second element in some way.

The term "judging (determining)" as in the present disclosure herein may encompass a wide variety of actions. For example, "judging (determining)" may be interpreted to mean making "judgments (determinations)" about judging, calculating, computing, processing, deriving, investigating, looking up, search and inquiry (for example, searching a table, a database, or some other data structures), ascertaining, and so on.

Furthermore, "judging (determining)" may be interpreted to mean making "judgments (determinations)" about receiving (for example, receiving information), transmitting (for example, transmitting information), input, output, accessing (for example, accessing data in a memory), and so on.

In addition, "judging (determining)" as used herein may be interpreted to mean making "judgments (determinations)" about resolving, selecting, choosing, establishing, comparing, and so on. In other words, "judging (determining)" may be interpreted to mean making "judgments (determinations)" about some action.

In addition, "judging (determining)" may be interpreted as "assuming," "expecting," "considering," and the like.

The terms "connected" and "coupled," or any variation of these terms as used in the present disclosure mean all direct or indirect connections or coupling between two or more elements, and may include the presence of one or more intermediate elements between two elements that are "connected" or "coupled" to each other. The coupling or connection between the elements may be physical, logical, or a combination thereof. For example, "connection" may be interpreted as "access."

In the present disclosure, when two elements are connected, the two elements may be considered "connected" or "coupled" to each other by using one or more electrical wires, cables and printed electrical connections, and, as some non-limiting and non-inclusive examples, by using electromagnetic energy having wavelengths in radio frequency regions, microwave regions, (both visible and invisible) optical regions, or the like.

In the present disclosure, the phrase "A and B are different" may mean that "A and B are different from each other." Note that the phrase may mean that "A and B is each different from C." The terms "separate," "be coupled," and so on may be interpreted similarly to "different."

When terms such as "include," "including," and variations of these are used in the present disclosure, these terms are intended to be inclusive, in a manner similar to the way the term "comprising" is used. Furthermore, the term "or" as used in the present disclosure is intended to be not an exclusive disjunction.

For example, in the present disclosure, when an article such as "a," "an," and "the" in the English language is added by translation, the present disclosure may include that a noun after these articles is in a plural form.

Now, although the invention according to the present disclosure has been described in detail above, it should be obvious to a person skilled in the art that the invention according to the present disclosure is by no means limited to the embodiments described in the present disclosure. The invention according to the present disclosure can be implemented with various corrections and in various modifications, without departing from the spirit and scope of the invention defined by the recitations of claims. Consequently, the description of the present disclosure is provided only for the purpose of explaining examples, and should by no means be construed to limit the invention according to the present disclosure in any way.

The invention claimed is:

1. A terminal comprising:
   a receiver that receives downlink control information (DCI) indicating one or more sounding reference signal (SRS) resource indicators (SRIs); and
   a processor that, based on a value of bits included in the DCI and indicating a transmit precoding matrix indicator (TPMI), controls a physical uplink shared channel (PUSCH) transmission using one transmission/reception point (TRP) when the DCI indicates one SRI, and controls a PUSCH transmission using multiple TRPs when the DCI indicates a plurality of SRIs.

2. The terminal according to claim 1, wherein when the DCI indicates a plurality of SRIs, the processor determines that a number of antenna ports is the same between a plurality of SRS resources corresponding to the plurality of SRIs.

3. The terminal according to claim 1, wherein when the DCI indicates one SRI, the processor controls the PUSCH transmission using the one TRP based on a value of a specific number of lower order bits of the bits indicating the TPMI, and ignores a value of remaining bits of the bits indicating the TPMI.

4. A radio communication method for a terminal, comprising:
   receiving downlink control information (DCI) indicating one or more sounding reference signal (SRS) resource indicators (SRIs); and
   based on a value of bits included in the DCI and indicating a transmit precoding matrix indicator (TPMI), controlling a physical uplink shared channel (PUSCH) transmission using one transmission/reception point (TRP) when the DCI indicates one SRI, and controlling a PUSCH transmission using multiple TRPs when the DCI indicates a plurality of SRIs.

5. A base station comprising:
   a transmitter that transmits downlink control information (DCI) indicating one or more sounding reference signal (SRS) resource indicators (SRIs); and
   a processor that controls reception of a physical uplink shared channel (PUSCH) using one transmission/reception point (TRP) when the DCI indicates one SRI, and controls reception of a PUSCH using multiple TRPs when the DCI indicates a plurality of SRIs, the PUSCH using the one TRP and the PUSCH using the multiple TRPs being transmitted based on a value of bits included in the DCI and indicating a transmit precoding matrix indicator (TPMI).

6. A system comprising a terminal and a base station, wherein
   the terminal comprises:
      a receiver that receives downlink control information (DCI) indicating one or more sounding reference signal (SRS) resource indicators (SRIs); and
      a processor that, based on a value of bits included in the DCI and indicating a transmit precoding matrix indicator (TPMI), controls a physical uplink shared channel (PUSCH) transmission using one transmission/reception point (TRP) when the DCI indicates one SRI, and controls a PUSCH transmission using multiple TRPs when the DCI indicates a plurality of SRIs, and
   the base station comprises:
      a transmitter that transmits the DCI.

* * * * *